(12) United States Patent
Kraeuter et al.

(10) Patent No.: US 10,160,394 B2
(45) Date of Patent: Dec. 25, 2018

(54) ROOFTOP CARGO CARRYING SYSTEMS WITH BIAXIAL CLIP ADJUSTMENT

(71) Applicant: Yakima Products, Inc., Lake Oswego, OR (US)

(72) Inventors: Charles Kraeuter, Portland, OR (US); David Condon, Beaverton, OR (US); John Mark Elliott, Beaverton, OR (US)

(73) Assignee: Yakima Products, Inc., Lake Oswego, OR (US)

( * ) Notice: Subject to any disclaimer, the term of this patent is extended or adjusted under 35 U.S.C. 154(b) by 157 days.

(21) Appl. No.: 15/170,326

(22) Filed: Jun. 1, 2016

(65) Prior Publication Data

US 2016/0362059 A1     Dec. 15, 2016

Related U.S. Application Data

(60) Provisional application No. 62/173,333, filed on Jun. 9, 2015, provisional application No. 62/175,192, filed on Jun. 12, 2015.

(51) Int. Cl.
   *B60R 9/048* (2006.01)
   *B60R 9/058* (2006.01)
   (Continued)

(52) U.S. Cl.
   CPC ............... *B60R 9/058* (2013.01); *B60R 9/05* (2013.01); *B60R 9/052* (2013.01); *B60R 2011/0059* (2013.01)

(58) Field of Classification Search
   CPC ............................... B60R 9/048; B60R 9/052
   (Continued)

(56) References Cited

U.S. PATENT DOCUMENTS 488,395 A     12/1892   Justice
529,827 A     11/1894   Fonda
(Continued)

FOREIGN PATENT DOCUMENTS

AU   2003231667 A1   2/2004
AU   2006100386 A4   6/2006
(Continued)

OTHER PUBLICATIONS

Yakima Car Racks, Wing Bars and Locking RailRiders, 1997 Catalog, p. 9.

(Continued)

*Primary Examiner* — Brian D Nash
(74) *Attorney, Agent, or Firm* — Kolisch Hartwell, P.C.

(57) ABSTRACT

A coupling assembly for connecting a rooftop cargo carrying system to a vehicle may include a coupler body including a crossbar clamp configured to be coupled to a crossbar. The crossbar may have a long axis oriented transverse to a direction of vehicle travel. The coupling assembly may include a base portion configured to abut a roof of the vehicle and a clip retention and adjustment assembly. The clip retention and adjustment assembly may include (a) a carriage pivotally mounted to the coupler body and configured to rotate around a rotation axis oriented parallel to the direction of vehicle travel, the carriage having a slot for receiving a clip along a translation axis perpendicular to the rotation axis, (b) a catch configured to releasably engage an aperture in the clip, (c) a first actuator configured to rotate the carriage around the rotation axis, and (d) a second actuator configured to move the catch and the clip relative to the coupler body along the translation axis.

13 Claims, 14 Drawing Sheets

(51) Int. Cl.
  *B60R 9/05* (2006.01)
  *B60R 9/052* (2006.01)
  *B60R 11/00* (2006.01)
(58) Field of Classification Search
  USPC .................................................. 224/323, 322
  See application file for complete search history.

(56) References Cited

U.S. PATENT DOCUMENTS

| | | |
|---|---|---|
| 556,789 A | 3/1896 | Walker |
| 576,351 A | 2/1897 | Penfield |
| 586,681 A | 7/1897 | Douglas |
| 607,024 A | 7/1898 | Durfee et al. |
| 614,264 A | 11/1898 | Fletcher |
| 615,264 A | 12/1898 | Du Pont |
| 1,179,823 A | 4/1916 | Greene |
| 1,789,458 A | 1/1931 | Bureau |
| 2,206,328 A | 7/1940 | Martinek |
| 2,248,170 A | 7/1941 | Hansen |
| 2,302,300 A | 11/1942 | Davies |
| 2,317,195 A | 4/1943 | Husted |
| 2,415,286 A | 2/1947 | Hyde |
| 2,431,400 A | 11/1947 | Iverson |
| 2,536,797 A | 1/1951 | Cooke |
| 2,551,218 A | 5/1951 | Menne |
| 2,573,187 A | 10/1951 | Désilets |
| 2,584,283 A | 2/1952 | Oliver et al. |
| 2,613,020 A | 10/1952 | Berry |
| 2,696,231 A | 12/1954 | Pardo |
| 2,723,005 A | 11/1955 | Wink |
| 2,729,499 A | 1/1956 | Eggum |
| 2,816,672 A | 12/1957 | Facchini |
| 2,988,253 A | 6/1961 | Menghi |
| 3,001,679 A | 9/1961 | Canning et al. |
| 3,042,240 A | 7/1962 | Cline |
| 3,064,868 A | 11/1962 | Treydte |
| 3,113,642 A | 12/1963 | Lay |
| 3,116,836 A | 1/1964 | McCauley |
| 3,155,249 A | 11/1964 | Johnson |
| 3,186,569 A | 6/1965 | Roux |
| 3,190,587 A | 6/1965 | Fries |
| 3,221,960 A | 12/1965 | Gleason et al. |
| 3,239,115 A | 3/1966 | Bott et al. |
| 3,240,406 A | 3/1966 | Logan |
| 3,276,085 A | 10/1966 | Spranger |
| 3,300,171 A | 1/1967 | Watts |
| 3,378,182 A | 4/1968 | McMiller |
| RE26,538 E | 3/1969 | Bott |
| RE26,539 E | 3/1969 | Bott |
| 3,430,983 A | 3/1969 | Jones |
| 3,460,694 A | 8/1969 | Simms |
| 3,469,810 A | 9/1969 | Dorris |
| 3,519,180 A | 7/1970 | Bott |
| 3,529,737 A | 9/1970 | Daugherty |
| 3,554,416 A | 1/1971 | Bott |
| 3,581,962 A | 6/1971 | Osborn |
| 3,596,788 A | 8/1971 | Willie |
| 3,606,432 A | 9/1971 | Honatzis |
| 3,615,069 A | 10/1971 | Bott |
| 3,642,157 A | 2/1972 | Williams, Jr. |
| 3,643,973 A | 2/1972 | Bott |
| 3,677,195 A | 7/1972 | Prete, Jr. |
| 3,677,451 A | 7/1972 | Burland |
| 3,737,083 A | 6/1973 | Lund |
| 3,740,034 A | 6/1973 | Scroggins |
| 3,744,689 A | 7/1973 | Kjensmo |
| 3,777,922 A | 12/1973 | Kirchmeyer |
| 3,826,390 A | 7/1974 | Watson |
| 3,828,993 A | 8/1974 | Carter |
| 3,837,547 A * | 9/1974 | Joos ..................... B60R 9/058 224/331 |
| 3,843,001 A | 10/1974 | Willis |
| 3,848,784 A | 11/1974 | Shimano et al. |
| 3,848,785 A | 11/1974 | Bott |
| 3,858,774 A | 1/1975 | Friis |
| 3,861,533 A | 1/1975 | Radek |
| 3,892,455 A | 7/1975 | Sotolongo |
| D238,771 S | 2/1976 | Spokus, Sr. |
| 3,946,917 A | 3/1976 | Crawford et al. |
| 3,951,320 A | 4/1976 | Bott |
| 3,976,213 A | 8/1976 | Ball |
| 3,993,167 A | 11/1976 | Reed |
| 4,015,760 A | 4/1977 | Bott |
| 4,022,362 A | 5/1977 | Revercomb |
| 4,023,761 A | 5/1977 | Molis |
| 4,034,879 A | 7/1977 | Cudmore |
| 4,046,297 A | 9/1977 | Bland |
| 4,050,616 A | 9/1977 | Mosow |
| 4,055,284 A | 10/1977 | Bott |
| 4,058,243 A | 11/1977 | Tappan |
| 4,081,118 A | 3/1978 | Mason |
| 4,085,763 A | 4/1978 | Thomas |
| 4,089,448 A | 5/1978 | Traeger |
| 4,099,658 A | 7/1978 | Bott |
| 4,106,680 A | 8/1978 | Bott |
| 4,114,409 A | 9/1978 | Scire |
| 4,126,228 A | 11/1978 | Bala et al. |
| 4,132,335 A | 1/1979 | Ingram |
| 4,156,497 A | 5/1979 | Bott |
| 4,162,755 A | 7/1979 | Bott |
| 4,165,827 A | 8/1979 | Bott |
| 4,170,322 A | 10/1979 | Bott |
| 4,171,077 A | 10/1979 | Richard, Jr. |
| 4,174,794 A | 11/1979 | Bott |
| 4,175,682 A | 11/1979 | Bott |
| 4,182,471 A | 1/1980 | Bott |
| 4,213,593 A | 7/1980 | Weik |
| 4,213,729 A | 7/1980 | Cowles et al. |
| 4,222,508 A | 9/1980 | Bott |
| 4,239,139 A | 12/1980 | Bott |
| 4,245,764 A | 1/1981 | Kowalski et al. |
| 4,264,025 A | 4/1981 | Ferguson et al. |
| 4,269,339 A | 5/1981 | Bott |
| 4,274,568 A | 6/1981 | Bott |
| 4,274,569 A | 6/1981 | Winter et al. |
| 4,274,570 A | 6/1981 | Bott |
| 4,277,009 A | 7/1981 | Bott |
| 4,295,587 A | 10/1981 | Bott |
| 4,323,182 A | 4/1982 | Bott |
| 4,326,655 A | 4/1982 | Gradek et al. |
| D264,203 S | 5/1982 | Bott |
| 4,342,411 A | 8/1982 | Bott |
| 4,350,380 A | 9/1982 | Williams |
| 4,358,037 A | 11/1982 | Heideman |
| 4,364,500 A | 12/1982 | Bott |
| 4,372,469 A | 2/1983 | Kowalski et al. |
| 4,401,247 A | 8/1983 | Zoor |
| 4,402,442 A | 9/1983 | Martino |
| 4,403,716 A | 9/1983 | Carlson et al. |
| 4,406,386 A | 9/1983 | Rasor et al. |
| 4,427,141 A | 1/1984 | Bott |
| 4,428,517 A | 1/1984 | Bott |
| 4,431,123 A | 2/1984 | Bott |
| 4,432,478 A | 2/1984 | Bott |
| 4,433,804 A | 2/1984 | Bott |
| 4,437,597 A | 3/1984 | Doyle |
| 4,440,333 A | 4/1984 | Bott |
| 4,442,961 A | 4/1984 | Bott |
| 4,448,336 A | 5/1984 | Bott |
| 4,448,337 A | 5/1984 | Cronce |
| 4,449,656 A | 5/1984 | Wouden |
| 4,460,116 A | 7/1984 | Bott |
| 4,469,261 A | 9/1984 | Stapleton et al. |
| 4,473,178 A | 9/1984 | Bott |
| 4,487,348 A | 12/1984 | Mareydt |
| 4,496,089 A * | 1/1985 | Eklund ................... B60R 9/058 224/320 |
| 4,501,385 A | 2/1985 | Bott |
| 4,516,709 A | 5/1985 | Bott |
| 4,524,893 A | 6/1985 | Cole |
| D282,155 S | 1/1986 | Bott |
| 4,586,638 A | 5/1986 | Prescott et al. |
| 4,588,117 A | 5/1986 | Bott |
| 4,589,622 A | 5/1986 | Hutter |

(56) References Cited

U.S. PATENT DOCUMENTS

| | | | |
|---|---|---|---|
| 4,616,771 A | 10/1986 | Heideman |
| 4,629,104 A | 12/1986 | Jacquet |
| 4,630,990 A | 12/1986 | Whiting |
| 4,639,039 A | 1/1987 | Nichols |
| 4,640,450 A | 2/1987 | Gallion et al. |
| 4,673,119 A | 6/1987 | Bott |
| 4,684,048 A | 8/1987 | Bott |
| 4,684,049 A | 8/1987 | Maby et al. |
| 4,688,706 A | 8/1987 | Thulin |
| 4,700,873 A | 10/1987 | Young |
| 4,702,398 A | 10/1987 | Seager |
| 4,702,401 A | 10/1987 | Graber et al. |
| RE32,583 E | 1/1988 | Bott |
| 4,717,165 A | 1/1988 | Johnson |
| 4,721,239 A | 1/1988 | Gibbs, III et al. |
| D294,340 S | 2/1988 | Robson |
| 4,724,692 A | 2/1988 | Turin et al. |
| 4,751,891 A | 6/1988 | Wilson |
| 4,754,905 A | 7/1988 | Bott |
| 4,757,929 A | 7/1988 | Nelson |
| 4,770,329 A | 9/1988 | Kamaya |
| 4,778,092 A | 10/1988 | Grace |
| 4,789,145 A | 12/1988 | Wenrich |
| D300,734 S | 4/1989 | Kruitbosch |
| 4,817,838 A | 4/1989 | Kamaya |
| 4,823,997 A | 4/1989 | Krieger |
| 4,830,249 A | 5/1989 | Mirenda et al. |
| 4,830,250 A | 5/1989 | Newbold et al. |
| 4,838,467 A | 6/1989 | Bott et al. |
| 4,848,112 A | 7/1989 | Graber et al. |
| 4,848,794 A | 7/1989 | Mader et al. |
| 4,875,608 A | 10/1989 | Graber |
| 4,877,168 A | 10/1989 | Bott |
| 4,877,169 A | 10/1989 | Grim |
| 4,887,754 A | 12/1989 | Boyer et al. |
| 4,890,777 A | 1/1990 | Bott |
| 4,892,279 A | 1/1990 | Lafferty et al. |
| 4,895,096 A | 1/1990 | Goodwin et al. |
| 4,899,917 A | 2/1990 | Bott |
| 4,911,348 A | 3/1990 | Rasor et al. |
| 4,917,428 A | 4/1990 | Sola |
| 4,917,429 A | 4/1990 | Giger |
| 4,934,572 A | 6/1990 | Bowman et al. |
| 4,944,439 A | 7/1990 | Bott |
| D310,196 S | 8/1990 | Bott |
| 4,960,356 A | 10/1990 | Wrenn |
| 4,961,524 A | 10/1990 | Hunts |
| 4,964,287 A | 10/1990 | Gaul |
| 4,967,945 A | 11/1990 | Bott |
| 4,972,983 A | 11/1990 | Bott |
| 4,976,123 A | 12/1990 | Ceron et al. |
| 4,993,615 A | 2/1991 | Arvidsson |
| 4,995,538 A | 2/1991 | Marengo |
| 4,997,332 A | 3/1991 | Johnson |
| 5,005,390 A | 4/1991 | Giannini et al. |
| 5,025,932 A | 6/1991 | Jay |
| 5,025,967 A | 6/1991 | Cronce et al. |
| 5,029,740 A | 7/1991 | Cox |
| 5,033,709 A | 7/1991 | Yuen |
| 5,037,019 A | 8/1991 | Sokn |
| 5,038,988 A | 8/1991 | Thulin |
| 5,042,705 A | 8/1991 | Johansson |
| 5,052,605 A | 10/1991 | Johansson |
| 5,056,700 A | 10/1991 | Blackburn et al. |
| 5,065,921 A | 11/1991 | Mobley |
| 5,104,020 A * | 4/1992 | Arvidsson ............... B60R 9/058 |
| | | 224/322 |
| 5,118,020 A | 6/1992 | Piretti |
| 5,118,125 A | 6/1992 | Plunkett |
| 5,119,654 A | 6/1992 | Ceron et al. |
| 5,123,147 A | 6/1992 | Blair |
| 5,131,669 A | 7/1992 | Kinnamon et al. |
| 5,136,709 A | 8/1992 | Shirakabe et al. |
| 5,137,195 A | 8/1992 | Walter |
| 5,143,267 A | 9/1992 | Cucheran et al. |
| 5,158,425 A | 10/1992 | Bott |
| 5,169,042 A | 12/1992 | Ching |
| 5,169,044 A | 12/1992 | Englander |
| 5,170,920 A | 12/1992 | Corrente et al. |
| 5,201,487 A | 4/1993 | Epplett |
| 5,201,911 A | 4/1993 | Lee |
| 5,203,483 A | 4/1993 | Cucheran |
| 5,205,453 A | 4/1993 | Pudney et al. |
| 5,207,365 A | 5/1993 | Bott |
| 5,215,233 A | 6/1993 | Baldeck |
| 5,217,149 A | 6/1993 | Simonett |
| 5,226,341 A | 7/1993 | Shores |
| 5,226,570 A | 7/1993 | Pedrini |
| 5,226,634 A | 7/1993 | Rudy, Jr. et al. |
| 5,230,449 A | 7/1993 | Collins et al. |
| 5,232,134 A | 8/1993 | Allen |
| 5,232,138 A | 8/1993 | Cucheran |
| 5,236,153 A | 8/1993 | LaConte |
| 5,244,101 A | 9/1993 | Palmer et al. |
| 5,253,913 A | 10/1993 | Metivier |
| 5,257,710 A | 11/1993 | Cropley |
| 5,259,542 A | 11/1993 | Newbold et al. |
| 5,275,319 A | 1/1994 | Ruana |
| 5,275,320 A | 1/1994 | Duemmler |
| 5,282,560 A | 2/1994 | Ozog |
| 5,282,562 A | 2/1994 | Legault |
| 5,284,282 A | 2/1994 | Mottino |
| 5,291,763 A | 3/1994 | Cuisinot |
| 5,294,033 A | 3/1994 | Duemmler |
| 5,314,104 A | 5/1994 | Lee |
| 5,320,264 A | 6/1994 | Weir |
| 5,326,007 A | 7/1994 | Pudney et al. |
| D349,680 S | 8/1994 | Powell |
| D350,527 S | 9/1994 | Parlor, Sr. |
| 5,346,355 A | 9/1994 | Riemer |
| 5,360,150 A | 11/1994 | Praz |
| 5,366,128 A * | 11/1994 | Grim ..................... B60R 9/058 |
| | | 224/322 |
| 5,375,750 A | 12/1994 | Mandarino et al. |
| 5,385,285 A | 1/1995 | Cucheran et al. |
| 5,388,938 A | 2/1995 | Helton |
| 5,397,042 A | 3/1995 | Pedrini |
| 5,400,938 A | 3/1995 | Kolodziej et al. |
| 5,416,957 A | 5/1995 | Renzi, Sr. et al. |
| 5,419,479 A | 5/1995 | Evels et al. |
| 5,433,356 A | 7/1995 | Russell |
| 5,433,550 A | 7/1995 | Huber |
| 5,435,475 A | 7/1995 | Hudson et al. |
| 5,442,840 A | 8/1995 | Ewald |
| 5,443,190 A | 8/1995 | Cucheran et al. |
| 5,445,300 A | 8/1995 | Eipper et al. |
| 5,452,831 A | 9/1995 | Linnhoff |
| 5,456,396 A | 10/1995 | Allen |
| 5,456,512 A | 10/1995 | Gibbs et al. |
| 5,458,268 A | 10/1995 | Hill |
| 5,471,714 A | 12/1995 | Olson |
| 5,474,218 A | 12/1995 | Arsenault, Jr. et al. |
| 5,476,201 A | 12/1995 | Hall et al. |
| 5,492,258 A | 2/1996 | Brunner |
| 5,499,762 A | 3/1996 | Lee |
| D369,140 S | 4/1996 | Sills |
| 5,511,894 A | 4/1996 | Ng |
| 5,516,017 A | 5/1996 | Arvidsson |
| 5,526,971 A | 6/1996 | Despain |
| 5,535,930 A | 7/1996 | Lee |
| 5,549,231 A | 8/1996 | Fletcher et al. |
| D373,988 S | 9/1996 | Johnson |
| 5,553,761 A | 9/1996 | Audoire et al. |
| 5,556,221 A | 9/1996 | Brunner |
| 5,570,825 A | 11/1996 | Cona |
| 5,577,650 A | 11/1996 | Stapleton |
| 5,582,044 A | 12/1996 | Bolich |
| 5,598,959 A | 2/1997 | Lorensen et al. |
| 5,617,617 A | 4/1997 | Gustin |
| 5,624,063 A | 4/1997 | Ireland |
| 5,628,336 A | 5/1997 | Lee |
| 5,647,522 A | 7/1997 | Routh |
| 5,657,913 A | 8/1997 | Cucheran et al. |
| D386,145 S | 11/1997 | Staller |

(56) References Cited

U.S. PATENT DOCUMENTS

| | | |
|---|---|---|
| 5,692,659 A | 12/1997 | Reeves |
| 5,695,164 A | 12/1997 | Hartmann et al. |
| 5,697,629 A | 12/1997 | Guild |
| 5,701,628 A | 12/1997 | Morad |
| 5,709,521 A | 1/1998 | Glass et al. |
| 5,730,343 A | 3/1998 | Settelmayer |
| 5,738,258 A | 4/1998 | Farrow et al. |
| 5,762,248 A | 6/1998 | Englander et al. |
| 5,769,291 A | 6/1998 | Chasan |
| 5,769,292 A | 6/1998 | Cucheran et al. |
| 5,775,557 A | 7/1998 | Arvidsson |
| 5,779,119 A | 7/1998 | Talbot et al. |
| 5,806,735 A | 9/1998 | Christiansson et al. |
| 5,810,226 A | 9/1998 | Lee |
| 5,820,002 A | 10/1998 | Allen |
| 5,826,765 A | 10/1998 | Rak et al. |
| 5,833,074 A | 11/1998 | Phillips |
| 5,845,828 A | 12/1998 | Settelmayer |
| 5,848,743 A | 12/1998 | Derecktor |
| 5,862,966 A | 1/1999 | Mehls |
| 5,868,621 A | 2/1999 | Parsons |
| 5,875,947 A | 3/1999 | Noel et al. |
| 5,924,614 A | 7/1999 | Kuntze et al. |
| 5,944,198 A | 8/1999 | Ihalainen |
| 5,951,231 A | 9/1999 | Allen |
| 5,984,155 A | 11/1999 | Stapleton |
| 5,988,403 A | 11/1999 | Robideau |
| 5,992,645 A | 11/1999 | West |
| 5,992,805 A | 11/1999 | Tanner |
| 5,996,736 A | 12/1999 | Stankiewicz |
| 6,010,048 A | 1/2000 | Settelmayer |
| 6,015,074 A | 1/2000 | Snavely et al. |
| 6,019,266 A | 2/2000 | Johnson |
| 6,050,467 A | 4/2000 | Drouillard et al. |
| 6,053,336 A | 4/2000 | Reeves |
| 6,062,450 A | 5/2000 | Noel et al. |
| 6,102,265 A | 8/2000 | Stapleton |
| 6,105,841 A | 8/2000 | Aftanas |
| 6,112,965 A | 9/2000 | Lundgren |
| 6,131,781 A | 10/2000 | Murray |
| 6,164,507 A | 12/2000 | Dean et al. |
| 6,176,404 B1 | 1/2001 | Fourel |
| 6,182,876 B1 | 2/2001 | Moliner |
| 6,189,868 B1 | 2/2001 | Santelli, Jr. |
| 6,193,252 B1 | 2/2001 | Lin |
| 6,244,483 B1 | 6/2001 | McLemore et al. |
| 6,273,311 B1 | 8/2001 | Pedrini |
| 6,276,747 B1 | 8/2001 | Ogawa et al. |
| 6,279,802 B1 | 8/2001 | Hickman et al. |
| 6,283,310 B1 | 9/2001 | Dean et al. |
| 6,286,738 B1 | 9/2001 | Robins et al. |
| 6,296,162 B1 | 10/2001 | Englander et al. |
| 6,305,589 B1 | 10/2001 | Chimenti et al. |
| 6,357,643 B1 | 3/2002 | Janner et al. |
| 6,385,822 B1 | 5/2002 | Dean et al. |
| D460,401 S | 7/2002 | Andersson |
| 6,422,441 B1 | 7/2002 | Settelmayer et al. |
| 6,439,397 B1 | 8/2002 | Reeves |
| 6,460,743 B2 | 10/2002 | Edgerly et al. |
| D467,220 S | 12/2002 | Walstrom et al. |
| 6,488,249 B1 | 12/2002 | Girardi et al. |
| 6,491,192 B2 | 12/2002 | Aki |
| 6,491,195 B1 | 12/2002 | McLemore et al. |
| 6,494,351 B1 | 12/2002 | Dean |
| 6,497,350 B1 * | 12/2002 | Hickey .................. B60R 9/058 224/329 |
| 6,516,985 B1 | 2/2003 | Lundgren |
| 6,523,730 B2 | 2/2003 | Anderson |
| 6,523,731 B2 | 2/2003 | Pedrini |
| 6,557,931 B1 | 5/2003 | Tremmel et al. |
| 6,561,398 B1 | 5/2003 | Cole et al. |
| 6,568,644 B2 | 5/2003 | Pedersen |
| 6,622,898 B1 | 9/2003 | Wang |
| 6,640,979 B1 | 11/2003 | Mayfield |
| 6,648,300 B2 | 11/2003 | Chamoun |
| 6,662,982 B1 | 12/2003 | Päkkilä |
| 6,681,971 B2 | 1/2004 | Laverack et al. |
| D487,720 S | 3/2004 | Thomas |
| 6,715,653 B2 | 4/2004 | DeCosta |
| 6,722,541 B1 | 4/2004 | Aftanas et al. |
| 6,736,300 B2 | 5/2004 | Deakin |
| 6,736,301 B2 | 5/2004 | Huang |
| 6,761,297 B1 | 7/2004 | Pedrini |
| 6,766,929 B2 | 7/2004 | Karlsson |
| 6,779,696 B2 | 8/2004 | Aftanas et al. |
| 6,793,186 B2 | 9/2004 | Pedersen |
| 6,796,471 B2 | 9/2004 | Aftanas et al. |
| 6,817,500 B2 | 11/2004 | Neaux |
| 6,840,418 B2 | 1/2005 | Robins et al. |
| 6,843,394 B2 | 1/2005 | Aki |
| 6,845,893 B2 | 1/2005 | Nelson |
| 6,845,922 B2 | 1/2005 | Stark |
| 6,857,545 B2 | 2/2005 | McLemore et al. |
| 6,868,998 B2 | 3/2005 | Dean |
| 6,892,912 B1 | 5/2005 | MacNeil |
| 6,892,913 B1 | 5/2005 | Andersson |
| 6,905,053 B2 | 6/2005 | Allen |
| 6,918,521 B2 | 7/2005 | Settelmayer et al. |
| 6,938,782 B2 | 9/2005 | Dean et al. |
| 6,968,986 B1 | 11/2005 | Lloyd et al. |
| 6,972,042 B2 | 12/2005 | Benson |
| 6,976,615 B2 | 12/2005 | Dean |
| 6,997,657 B1 | 2/2006 | Saward |
| 7,000,811 B2 | 2/2006 | Gilstrap et al. |
| 7,004,365 B2 | 2/2006 | Ingram |
| 7,036,698 B2 | 5/2006 | Allen |
| 7,044,347 B1 | 5/2006 | Pedrini |
| 7,051,909 B2 | 5/2006 | Gibson |
| 7,104,430 B2 | 9/2006 | Reeves |
| 7,117,768 B1 | 10/2006 | Stoeppelwerth |
| 7,131,561 B2 | 11/2006 | Humes |
| 7,175,218 B1 | 2/2007 | Keene |
| 7,182,233 B1 | 2/2007 | Graffy et al. |
| 7,201,436 B2 | 4/2007 | Ludwig et al. |
| 7,222,763 B2 | 5/2007 | Pedrini |
| 7,234,617 B2 | 6/2007 | Weaver et al. |
| 7,240,816 B2 | 7/2007 | Tsai |
| D561,680 S | 2/2008 | Foley et al. |
| D562,217 S | 2/2008 | Davis et al. |
| D562,218 S | 2/2008 | Foley et al. |
| 7,328,824 B2 | 2/2008 | Smith et al. |
| D564,438 S | 3/2008 | Moore |
| D566,034 S | 4/2008 | Davis et al. |
| 7,357,283 B2 | 4/2008 | Settelmayer |
| 7,367,481 B2 | 5/2008 | Barbara |
| 7,404,504 B2 | 7/2008 | Settelmayer |
| 7,413,143 B2 | 8/2008 | Frantz et al. |
| 7,416,098 B2 | 8/2008 | Settelmayer et al. |
| 7,427,049 B2 | 9/2008 | Kennedy et al. |
| 7,481,344 B2 | 1/2009 | Näslund et al. |
| 7,641,249 B2 | 1/2010 | Jung |
| 7,648,151 B2 | 1/2010 | Pedrini |
| 7,721,925 B1 | 5/2010 | Graffy et al. |
| 7,726,528 B2 | 6/2010 | Foley |
| 7,757,914 B2 | 7/2010 | Book et al. |
| D622,208 S | 8/2010 | Sautter et al. |
| 7,784,656 B2 | 8/2010 | Morrill et al. |
| D623,117 S | 9/2010 | Farber |
| 7,815,084 B2 | 10/2010 | Allen et al. |
| D633,030 S | 2/2011 | Robertson |
| D635,086 S | 3/2011 | Shen |
| D638,778 S | 5/2011 | Giddens |
| D642,113 S | 7/2011 | Farber |
| 7,975,888 B2 | 7/2011 | Settelmayer |
| 8,020,737 B2 | 9/2011 | Sweeney |
| 8,021,169 B1 | 9/2011 | Smith |
| 8,087,557 B2 | 1/2012 | Larsson et al. |
| 8,104,651 B2 | 1/2012 | Bingham |
| 8,113,398 B2 | 2/2012 | Sautter et al. |
| 8,136,708 B2 | 3/2012 | Sautter et al. |
| 8,136,709 B2 | 3/2012 | Jeli et al. |
| D656,887 S | 4/2012 | Bogoslofski et al. |
| 8,196,789 B2 | 6/2012 | Kraeuter et al. |
| 8,210,407 B2 | 7/2012 | Sautter et al. |

(56) References Cited

U.S. PATENT DOCUMENTS

| | | |
|---|---|---|
| 8,235,267 B2 | 8/2012 | Sautter et al. |
| 8,245,893 B2 | 8/2012 | Sautter et al. |
| D669,017 S | 10/2012 | Robertson |
| 8,333,311 B2 | 12/2012 | Hubbard |
| 8,393,508 B2 | 3/2013 | Sautter et al. |
| 8,408,853 B2 | 4/2013 | Womack et al. |
| 8,505,793 B2 | 8/2013 | Foley |
| 8,544,707 B2 | 10/2013 | Hubbard |
| 8,668,181 B2 | 3/2014 | Dazet et al. |
| D703,605 S | 4/2014 | Sautter et al. |
| 8,763,870 B2 | 7/2014 | Davis |
| D717,722 S | 11/2014 | Cagampang et al. |
| 8,925,775 B2 | 1/2015 | Sautter et al. |
| 9,102,274 B2 | 8/2015 | Hubbard |
| 9,132,782 B2 | 9/2015 | Hubbard |
| 9,409,527 B2 | 8/2016 | Hubbard |
| 2001/0013528 A1 | 8/2001 | Chimenti et al. |
| 2002/0053581 A1 | 5/2002 | Peschmann et al. |
| 2002/0125282 A1 | 9/2002 | Laverack et al. |
| 2003/0071097 A1 | 4/2003 | Dean |
| 2003/0164390 A1 | 9/2003 | Higginbotham, III |
| 2003/0178457 A1 | 9/2003 | Wang |
| 2003/0222112 A1 | 12/2003 | McLemore et al. |
| 2004/0118886 A1 | 6/2004 | Mirshafiee et al. |
| 2004/0211801 A1 | 10/2004 | Barbara |
| 2004/0238582 A1 | 12/2004 | Pedrini |
| 2005/0029320 A1 | 2/2005 | Chimenti et al. |
| 2005/0051585 A1 | 3/2005 | Kamiya et al. |
| 2005/0061842 A1 | 3/2005 | Tsai |
| 2005/0077335 A1 | 4/2005 | Bourne |
| 2005/0145639 A1 | 7/2005 | Viklund et al. |
| 2005/0205626 A1 | 9/2005 | Dean |
| 2005/0284905 A1 | 12/2005 | Naslund et al. |
| 2006/0000859 A1 | 1/2006 | Frischer |
| 2006/0029483 A1 | 2/2006 | Allen et al. |
| 2006/0049324 A1 | 3/2006 | Smith et al. |
| 2006/0060622 A1 | 3/2006 | Prenger |
| 2006/0086766 A1 | 4/2006 | Settelmayer |
| 2006/0208022 A1 | 9/2006 | Karlsson |
| 2006/0249466 A1 | 11/2006 | Wang |
| 2006/0273122 A1 | 12/2006 | Bogoslofski et al. |
| 2006/0273123 A1 | 12/2006 | Settelmayer |
| 2006/0273124 A1 | 12/2006 | Bogoslofski |
| 2006/0289577 A1 | 12/2006 | Malone |
| 2007/0036628 A1 | 2/2007 | Womack et al. |
| 2007/0108243 A1 | 5/2007 | Bingham |
| 2007/0119887 A1 | 5/2007 | Foley |
| 2007/0119888 A1 | 5/2007 | Chuang |
| 2007/0164065 A1 | 7/2007 | Davis |
| 2008/0000940 A1 | 1/2008 | Wang |
| 2008/0029563 A1 | 2/2008 | Malone |
| 2008/0053926 A1 | 3/2008 | Foley |
| 2008/0099522 A1 | 5/2008 | Clausen et al. |
| 2008/0101883 A1 | 5/2008 | Derecktor |
| 2008/0164292 A1 | 7/2008 | Farney |
| 2008/0193265 A1 | 8/2008 | Sautter et al. |
| 2008/0257924 A1 | 10/2008 | Kmita et al. |
| 2009/0014489 A1 | 1/2009 | Settelmayer et al. |
| 2009/0120984 A1 | 5/2009 | Sautter et al. |
| 2009/0159624 A1 | 6/2009 | Johnson et al. |
| 2009/0184189 A1 | 7/2009 | Soderberg et al. |
| 2009/0236382 A1 | 9/2009 | Sautter et al. |
| 2010/0078454 A1 | 4/2010 | Sautter et al. |
| 2010/0237116 A1 | 9/2010 | Hubbard |
| 2010/0282799 A1 | 11/2010 | Hubbard |
| 2010/0308091 A1 | 12/2010 | Hubbard |
| 2011/0132946 A1 | 6/2011 | Sautter et al. |
| 2011/0139838 A1 | 6/2011 | Sautter et al. |
| 2011/0139841 A1 | 6/2011 | Sautter et al. |
| 2011/0139842 A1 | 6/2011 | Sautter et al. |
| 2011/0174853 A1 | 7/2011 | Hubbard |
| 2011/0290836 A1 | 12/2011 | Shen |
| 2013/0020361 A1 | 1/2013 | Sautter et al. |
| 2013/0022440 A1 | 1/2013 | Sautter et al. |
| 2013/0037585 A1 | 2/2013 | Hubbard et al. |
| 2013/0062379 A1 | 3/2013 | Sautter et al. |
| 2013/0062383 A1 | 3/2013 | Jeli |
| 2013/0062385 A1 | 3/2013 | Pedrini |
| 2013/0175308 A1 | 7/2013 | Sautter et al. |
| 2013/0200121 A1 | 8/2013 | Hubbard |
| 2013/0214020 A1 | 8/2013 | Pedrini |
| 2013/0284779 A1 | 10/2013 | Sautter et al. |
| 2014/0028007 A1 | 1/2014 | Pfeiffer et al. |
| 2014/0097220 A1 | 4/2014 | Sautter et al. |
| 2014/0144958 A1 | 5/2014 | Sautter et al. |
| 2014/0144959 A1 | 5/2014 | Sautter et al. |
| 2014/0144960 A1 | 5/2014 | Condon et al. |
| 2014/0158728 A1 | 6/2014 | Sautter et al. |
| 2014/0158729 A1 | 6/2014 | Pedrini |
| 2014/0166709 A1 | 6/2014 | Hubbard |
| 2015/0069102 A1 | 3/2015 | Hubbard |
| 2015/0232038 A1 | 8/2015 | Robertson |
| 2015/0239402 A1 | 8/2015 | Hubbard |

FOREIGN PATENT DOCUMENTS

| | | |
|---|---|---|
| AU | 2008301329 B2 | 8/2012 |
| AU | 348922 | 5/2013 |
| AU | 2008304016 B2 | 1/2014 |
| CA | 971140 A | 7/1975 |
| CN | 87104266 A | 3/1988 |
| CN | 2445963 Y | 9/2001 |
| CN | 101559737 A | 10/2009 |
| CN | 101559738 A | 10/2009 |
| CN | 101868375 A | 10/2010 |
| CN | 201677818 U | 12/2010 |
| CN | 102177047 A | 9/2011 |
| CN | 101861257 B | 11/2012 |
| CN | 101868376 B | 3/2013 |
| CN | 102975661 A | 3/2013 |
| CN | 102177047 B | 2/2015 |
| DE | 2940095 A1 | 4/1981 |
| DE | 2950449 A1 | 6/1981 |
| DE | 3034226 A1 | 4/1982 |
| DE | 3201409 A1 | 9/1983 |
| DE | 3209912 A1 | 10/1983 |
| DE | 3614740 A1 | 11/1987 |
| DE | 3626479 A1 | 2/1988 |
| DE | 3637856 A1 | 5/1988 |
| DE | 8801618 U1 | 8/1988 |
| DE | 3912692 A1 | 11/1989 |
| DE | 4229268 A1 | 3/1994 |
| DE | 4423607 C1 | 6/1995 |
| DE | 20007760 U1 | 8/2000 |
| DE | 20309766 U1 | 9/2003 |
| DE | 202005007566 U1 | 7/2005 |
| EP | 0019873 B1 | 10/1982 |
| EP | 0151907 A2 | 8/1985 |
| EP | 0193501 A2 | 9/1986 |
| EP | 0433495 A1 | 12/1989 |
| EP | 0482650 A1 | 4/1992 |
| EP | 0504588 A1 | 9/1992 |
| EP | 0511179 A1 | 10/1992 |
| EP | 0646074 B1 | 10/1996 |
| EP | 0398885 B2 | 6/1997 |
| EP | 0869879 A | 10/1998 |
| EP | 0894672 A1 | 2/1999 |
| EP | 0945307 A2 | 9/1999 |
| EP | 0989029 A1 | 3/2000 |
| EP | 1285817 A2 | 2/2003 |
| EP | 1340652 A1 | 9/2003 |
| EP | 1340653 A2 | 9/2003 |
| EP | 1422940 A1 | 8/2004 |
| EP | 1205358 B1 | 7/2005 |
| EP | 1568542 A1 | 8/2005 |
| EP | 1712420 A1 | 10/2006 |
| EP | 2334514 A | 6/2011 |
| EP | 2437961 A | 2/2012 |
| EP | 2507095 A | 10/2012 |
| EP | 2303641 B1 | 11/2012 |
| EP | 002172445-0001 | 4/2013 |
| EP | 002231878-0001 | 7/2013 |
| EP | 002343582-0001 | 1/2014 |
| EP | 002343756-0001 | 1/2014 |

(56) References Cited

FOREIGN PATENT DOCUMENTS

| | | |
|---|---|---|
| EP | 2200869 B1 | 4/2014 |
| EP | 2200867 B1 | 6/2014 |
| EP | 2758275 A | 7/2014 |
| EP | 2200868 B1 | 8/2014 |
| FR | 1400231 A | 4/1965 |
| FR | 2481209 A1 | 10/1981 |
| FR | 2501601 A1 | 9/1982 |
| FR | 2519305 A1 | 7/1983 |
| FR | 2600953 A1 | 1/1988 |
| FR | 2624808 A2 | 6/1989 |
| FR | 2632595 A1 | 12/1989 |
| FR | 2711346 A1 | 4/1995 |
| FR | 2752793 A1 | 3/1998 |
| GB | 886743 A | 1/1962 |
| GB | 1045619 A | 10/1966 |
| GB | 1311367 A | 3/1973 |
| GB | 2257463 A | 1/1993 |
| GB | 2277309 A | 10/1994 |
| GB | 2303344 A | 2/1997 |
| GB | 2475916 A | 6/2011 |
| JP | 63-53143 A | 3/1988 |
| JP | 9-20181 A | 1/1997 |
| JP | 10-250488 A | 9/1998 |
| JP | 2000-318538 A | 11/2000 |
| MX | 2011012988 A | 3/2012 |
| NZ | 551764 A | 3/2009 |
| NZ | 561809 A | 11/2009 |
| NZ | 561860 A | 4/2010 |
| NZ | 561811 A | 6/2010 |
| NZ | 571287 A | 3/2011 |
| NZ | 592162 A | 7/2012 |
| TW | 201111201 A | 4/2011 |
| WO | 9110581 A1 | 7/1991 |
| WO | 9202385 A1 | 2/1992 |
| WO | 9410007 A2 | 5/1994 |
| WO | 9624509 A1 | 8/1996 |
| WO | 9638336 A1 | 12/1996 |
| WO | 9702976 A1 | 1/1997 |
| WO | 9708017 A1 | 3/1997 |
| WO | 9810959 A1 | 3/1998 |
| WO | 9954168 A1 | 10/1999 |
| WO | 03006277 A1 | 1/2003 |
| WO | 2005021332 A1 | 3/2005 |
| WO | 2005102013 A2 | 11/2005 |
| WO | 2009038479 A1 | 3/2009 |
| WO | 2009038480 A1 | 3/2009 |
| WO | 2009041828 A1 | 4/2009 |
| WO | 2009158358 A1 | 12/2009 |
| WO | 2009158360 A1 | 12/2009 |
| WO | 2010030198 A1 | 3/2010 |
| WO | 2010141944 A1 | 12/2010 |
| WO | 2010144369 A1 | 12/2010 |
| WO | 2010148011 A1 | 12/2010 |
| WO | 2011084075 A1 | 7/2011 |
| WO | 2013036939 A1 | 3/2013 |
| WO | 2013040267 A1 | 3/2013 |
| WO | 2013164692 A2 | 11/2013 |
| WO | 2013165640 A1 | 11/2013 |
| WO | 2014022435 A1 | 2/2014 |

OTHER PUBLICATIONS

Roof Mounted Bike Racks sold by Bike Racks Plus. [Retrieved on Mar. 20, 2007]. © 2002-2005. Retrieved from the Internet <URL: http://www.bike-racks-plus.com/Roof_Mounted_Bike_Racks_y.htm>, 3 pages.

Rack Attack Portland's Blog, "Another hit from Yakima! The all new factory-compatible FrontLoader upright bike rack", Mar. 29, 2010, Retrieved from the Internet on Oct. 11, 2012, URL: http://rackattackportland.wordpress.com/2010/03/29another-hit-from-yakima-the-all-new-factory-compatible-frontloader-upright-bike-rack/, 3 pages.

Yakima FrontLoader upright bike rack review, Apr. 17, 2010, Retrieved from the Internet on Oct. 11, 2012, URL: http://carracks.blogspot.nl/2010/04/yakima-frontloader-upright-bike-rack.html, 2 pages.

ors racks direct.com, "Yakima FrontLoader Bike Rack Review Video by ORS Racks Direct", May 19, 2010, Retrieved from the Internet on Oct. 11, 2012, URL:http://www.youtube.com/watch?v=cu8rHM90Rdw, 9 pages.

Heinlen, Jerry, "Yakima FrontLoader Recall Information", Apr. 28, 2011, Retrieved from the Internet on Oct. 11, 2012, URL:http://firecall.yakima.com, 2 pages.

Yakima, "Frontloader", Oct. 11, 2012, Retrieved from the Internet on Oct. 11, 2012, URL:http://yakima.com/shop/bike/roof/frontloader#pr-header-8002103, 5 pages.

* cited by examiner

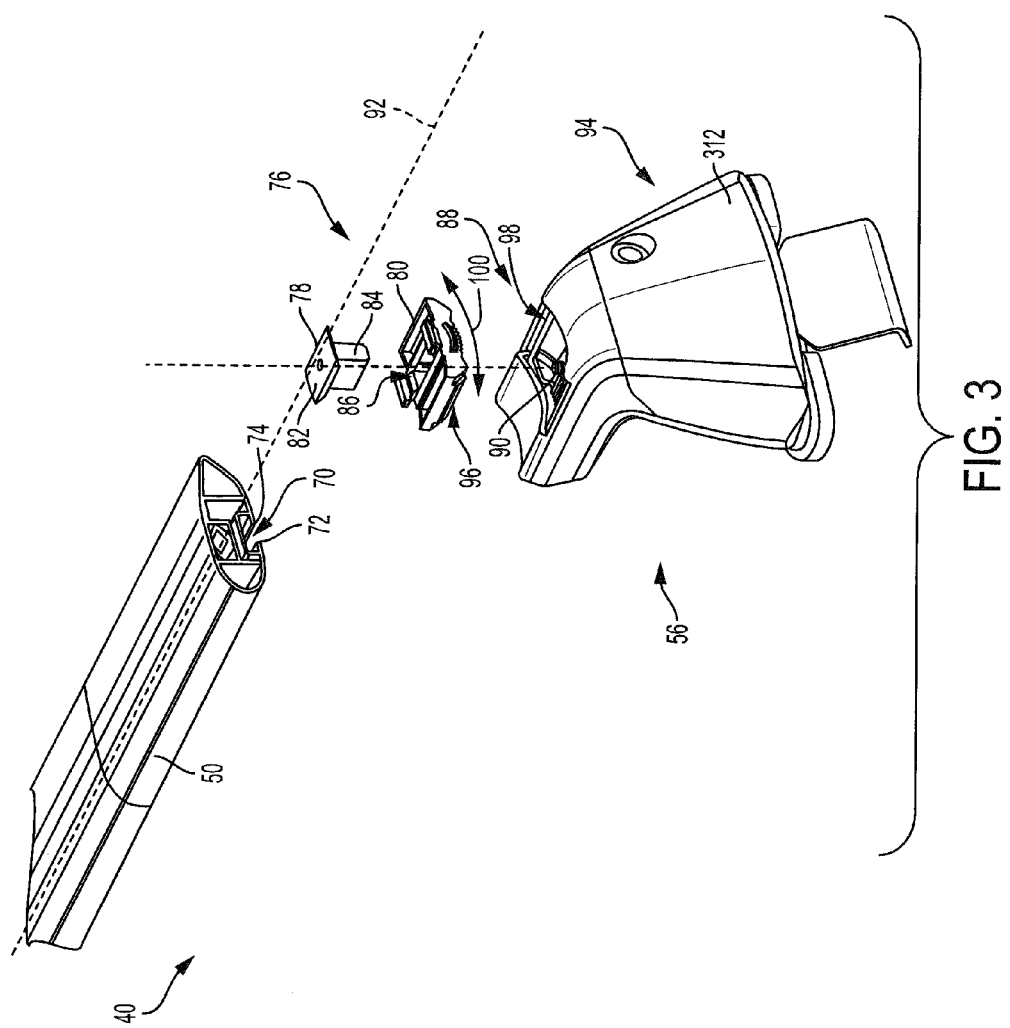

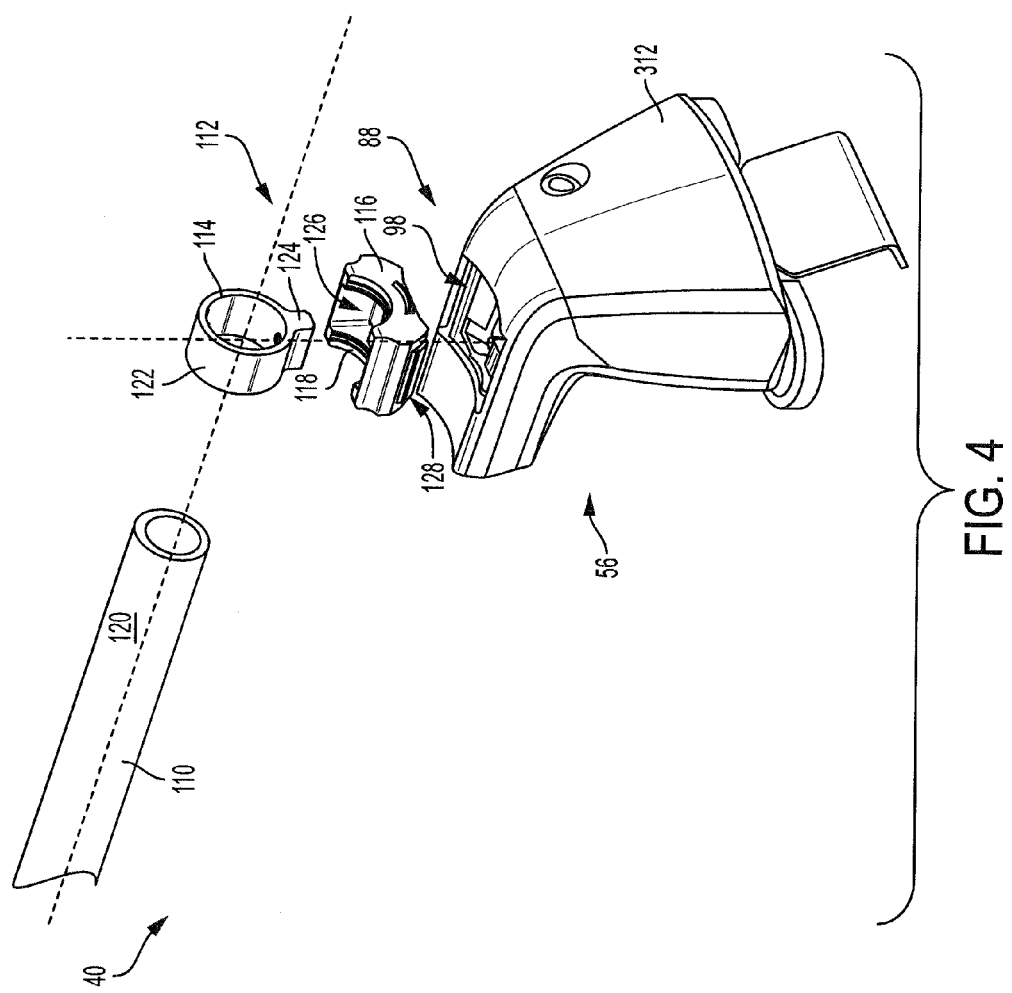

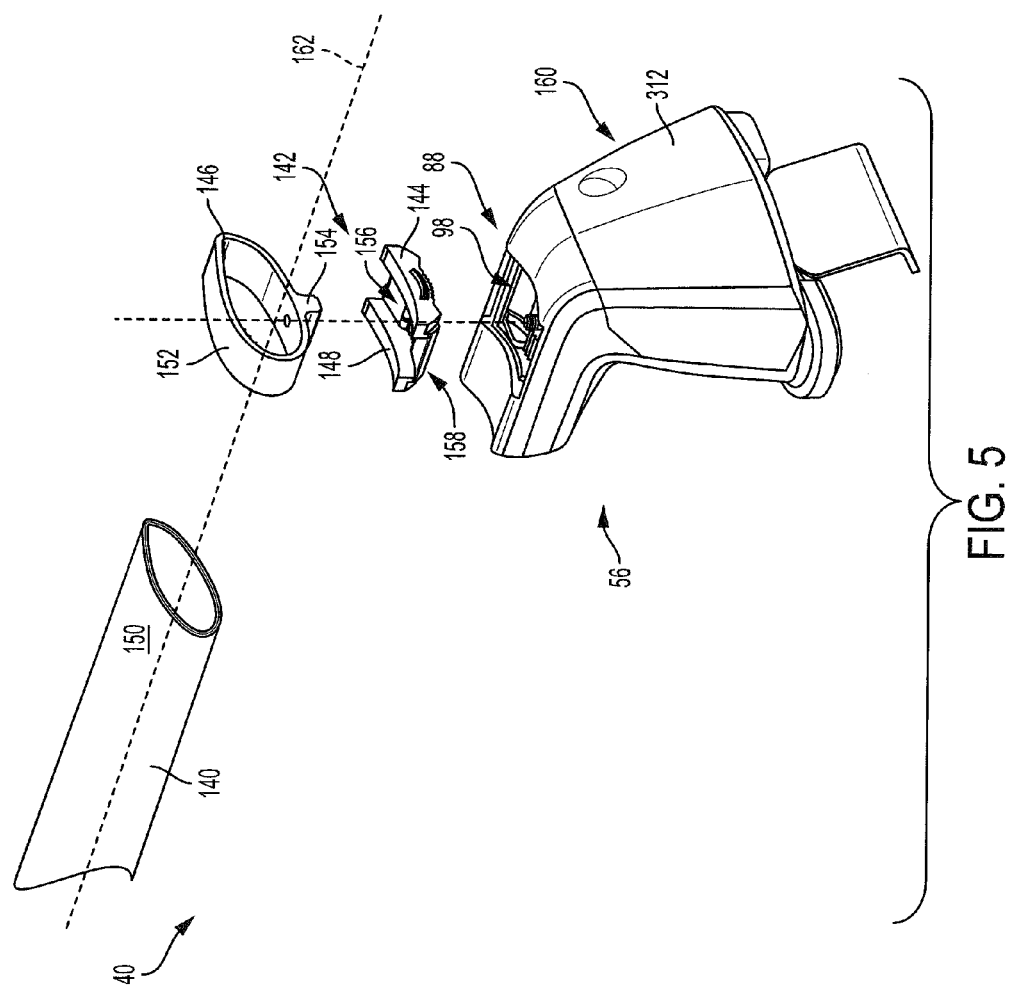

ROOFTOP CARGO CARRYING SYSTEMS WITH BIAXIAL CLIP ADJUSTMENT

CROSS-REFERENCES

This application claims priority from U.S. Provisional Patent Application Ser. No. 62/173,333, filed Jun. 9, 2015, and U.S. Provisional Patent Application Ser. No. 62/175,192, filed Jun. 12, 2015, all of which are hereby incorporated by reference.

The following related applications and materials are incorporated herein, in their entireties, for all purposes: U.S. Pat. No. 6,905,053, U.S. Pat. No. 8,393,508, and U.S. patent application Ser. No. 15/167,774.

FIELD

This disclosure relates to systems and methods for coupling rooftop racks to roofs of vehicles. More specifically, the disclosed embodiments relate to crossbar-to-vehicle couplers and related clamping systems.

INTRODUCTION

Popularity of recreational activities continues to grow, with a corresponding growth in the need for carrying recreational equipment and cargo on vehicles. Accordingly, various equipment carriers and accessories have been developed over the years, for recreational items such as bicycles, skis, surf boards, standup paddle boards, kayaks, and the like. Many such carriers and accessories are supported on rooftop racks.

Meanwhile, the number of different vehicle rooftop configurations has grown as well, with various shapes, sizes, and features depending on the make and model of the vehicle. For example, rooftop rails may be flush on the roof, raised, or not present at all. Similarly, rooftops themselves may be relatively flat or curved, and a width of the roof may change from front to back.

Rooftop racks typically include crossbars mounted to the vehicle roof, and the crossbars themselves may be of various shapes and sizes, from square to round to aerodynamic.

With all this variation, rooftop rack systems must typically incorporate a myriad of components customized to fit each style of roof and rooftop feature. A need exists for a simplified system of crossbars, support towers, and connection features, with a reduction in customized components.

SUMMARY

The coupling assembly with biaxial clip adjustment, as well as related systems and methods according to the present teachings, allow attachment of roof racks including crossbars to vehicle roofs free of attachment points or roof rails.

In some embodiments, a rack for carrying cargo on top of a vehicle may include a crossbar and a pair of coupling assemblies configured to mount the crossbar on top of a vehicle such that a long axis of the crossbar is substantially horizontal and perpendicular to a longitudinal axis of the vehicle. Each coupling assembly may include a coupler body including a crossbar clamp assembly configured to be coupled to the crossbar and a base portion configured to sit on a roof of the vehicle. Each coupling assembly may further include a clip configured to grip an edge portion of the roof of the vehicle and a clip retention and adjustment mechanism. The clip retention and adjustment mechanism may be configured to independently allow angular adjustment of the clip around a rotation axis and linear adjustment of the clip along a translation axis. The rotation axis may be perpendicular to the long axis of the crossbar and the translation axis may be perpendicular to the rotation axis.

In some embodiments, a coupling assembly for connecting a rooftop cargo carrying system to a vehicle may include a coupler body including a crossbar clamp configured to be coupled to a crossbar. The crossbar may have a long axis oriented transverse to a direction of vehicle travel. The coupling assembly may include a base portion configured to abut a roof of the vehicle and a clip retention and adjustment assembly. The clip retention and adjustment assembly may include (a) a carriage pivotally mounted to the coupler body and configured to rotate around a rotation axis oriented parallel to the direction of vehicle travel, the carriage having a slot for receiving a clip along a translation axis perpendicular to the rotation axis, (b) a catch configured to releasably engage an aperture in the clip, (c) a first actuator configured to rotate the carriage around the rotation axis, and (d) a second actuator configured to move the catch and the clip relative to the coupler body along the translation axis.

In some embodiments, a method of removably attaching a coupling assembly for use in a rooftop cargo carrying system to a roof of a vehicle may include disposing the coupling assembly on the roof of the vehicle proximate an edge portion of the roof. The coupling assembly may include a base portion connected to a coupler body, with the base portion abutting the roof of the vehicle. The method may include adjusting an angle of a clip relative to the coupler body by rotating the clip about a rotation axis oriented parallel to a direction of vehicle travel and adjusting an extent of the clip relative to the coupler body by moving the clip along a translation axis perpendicular to the rotation axis. The clip may be configured to grip the edge portion of the roof by adjusting the angle of the clip relative to the coupler body and by adjusting the extent of the clip relative to the coupler body. Adjusting the angle of the clip may be independent of adjusting the extent of the clip.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 3 is an exploded view of a portion of the vehicle roof rack system of FIG. 2, showing hardware for coupling a support tower to a T-slot underneath a crossbar.

FIG. 4 is an exploded view of a portion of another embodiment of a vehicle roof rack system, showing hardware for coupling a support tower to a round crossbar.

FIG. 5 is an exploded view of a portion of another embodiment of a vehicle roof rack system, showing hardware for coupling a support tower to an aerodynamically-shaped crossbar.

DETAILED DESCRIPTION

Various embodiments of a support tower having a clip which can be adjusted around a rotation axis and along a translation axis are described below and illustrated in the associated drawings. Unless otherwise specified, the support tower and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other similar devices and methods. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

The terms "inboard," "outboard," "forward," "aft," and the like are intended to be understood in the context of a host vehicle on which systems described herein may be mounted or otherwise attached. Terms regarding lateral orientation or positioning may be considered relative to an imaginary central vertical plane dividing the vehicle into left and right sides. For example, "outboard" may indicate a relative position that is laterally farther from the central vertical plane, or a direction that is away from the central vertical plane. Conversely, "inboard" may indicate a direction toward the central vertical plane, or a relative position that is closer to the central vertical plane. Similarly, "forward" means toward the front of the vehicle, and "aft" means toward the rear of the vehicle. In the absence of a host vehicle, the same directional terms may be used as if the vehicle were present. For example, even when viewed in isolation, a crossbar may have a "forward" edge, based on the fact that the edge in question would be installed facing the front portion of a host vehicle.

Overview of a Roof Rack System

Figure 1:
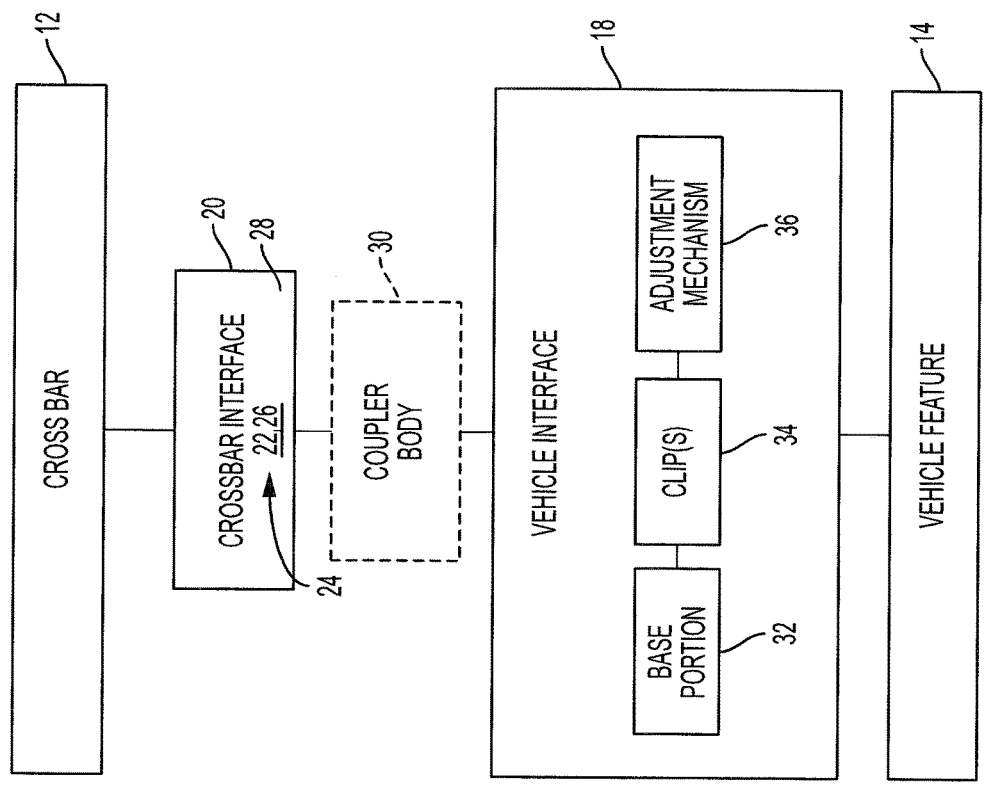
FIG. 1 is a schematic representation of a vehicle roof rack system for carrying cargo on top of a vehicle.

In general, and with reference to FIG. 1, a vehicle roof rack system 10 may include any suitable combination of components configured to removably and securely affix a selected crossbar to a vehicle rooftop. The crossbar is supported at either end by a pair of supports having features that facilitate attachment to corresponding feature(s) on the specific host vehicle. The crossbar supports may also be referred to as support towers, feet, coupling assemblies or mounts, and are referred to herein as couplers. A versatile and efficient system may be provided to fit a selected crossbar to the wide range of vehicle rooftops present in the marketplace.

Accordingly, roof rack system 10 may include one or more types of crossbars 12 suitable for use on a range of vehicles. Each type of crossbar 12 may include any suitable crossbar configured to be mounted transverse to the longitudinal axis of a vehicle, across a rooftop, and to support loads placed thereon. For example, a crossbar 12 may support a bicycle carrier, ski carrier, kayak carrier, and/or the like. Crossbars are typically mounted on a vehicle in pairs, such that a forward and an aft crossbar are present on the host vehicle for proper load carrying. Crossbars 12 may have any suitable cross section, such as round, square, teardrop, aerodynamic, and/or any other suitable shape or combination of shapes. Specific embodiments of crossbars 12 are described in further detail below.

Crossbars 12 are supported by attaching or fastening each of the crossbars to one or more specific vehicle features 14. Vehicles come in many shapes and sizes, with a corresponding array of roof topologies. Vehicle features 14, to which the crossbars may be attached, can include raised rails running along lateral sides of a rooftop, flush rails with no space between the rails and the roof, channels or hard points on the roof, side edges or gutters of a naked roof, etc. and/or the like.

To fasten the outboard ends of the crossbars to features 14, system 10 may include one or more couplers 16, also referred to as supports, towers, feet, or mounts, as mentioned above. Each coupler 16 may include any suitable vehicle interface 18 configured to attach, clamp, and/or removably connect to one or more vehicle features 14. Each coupler 16 may also include any suitable crossbar interface 20 configured to provide an attachment point or mount for a crossbar 12.

In some examples, crossbar interface 20 may include a universal interface for connecting a variety of crossbars. Each specific crossbar 12 may include or be associated with a crossbar connector 22 (also referred to as an adapter) configured to comprise a crossbar-specific bar clamp 24 when combined with a crossbar seat 26. Crossbar interface 20 may include a threaded bolt protruding upward from support 16. In this example, crossbar connector 22 may include a threaded portion for receiving the threaded bolt, as well as a holder portion for gripping, grasping, or grabbing onto the specific crossbar. Various crossbar connectors may each be attachable, interchangeably, to the same threaded bolt of the interface.

Bar clamp 24 may be used to removably and securely attach crossbar 12 to coupler 16. Accordingly, crossbar interface 20 of coupler 16 includes a crossbar (or bar) clamp actuator 28 configured to tighten, draw together, or otherwise cause clamp 24 to securingly engage the crossbar. Bar clamp actuator 28 may include a manual actuator or manual actuating mechanism. Illustrative examples of bar clamp actuators 28 are described in detail below.

Crossbar connector 22 and/or crossbar seat 26 may be grouped or provided with crossbar 12 to form a kit suitable for connecting to remaining elements of crossbar interface 20 of one or more different couplers 16. In other examples, crossbar connector 22 and/or crossbar seat 26 may be grouped or provided with coupler 16, to form a customized coupler suitable for connecting to a specific crossbar 12. From these examples, it should be clear that selected combinations of subcomponents of system 10 may be provided independently or separately, and combined or assembled as appropriate (e.g., for a specific vehicle).

In some examples, coupler 16 may include a coupler body or body portion 30 providing structural and/or other functional aspects of the coupler, e.g., locking devices, environmental, aesthetic, and/or aerodynamic outer housing features, internal support structure, etc. Vehicle interface 18 and/or crossbar interface 20 may be attached, unitary with, and/or coupled to coupler body portion 30. Alternatively or additionally, crossbar interface 20 and vehicle interface 18 may be coupled to each other.

Vehicle interface 18 may include any suitable structure and/or device configured to removably attach to a given vehicle feature (or features) 14. For example, vehicle interface 18 may include a clamp, hook, bolt, clip, strap, and/or the like, and/or any combination of these. To provide an efficient and versatile system, a selected number of vehicle interface types may be provided, some having modifiable or selectable components for further customization. Specific examples of vehicle interfaces 18 are mentioned in the examples below.

In some examples, vehicle interface 18 may include a base or base portion 32 configured to sit on or abut the vehicle feature 14. The base portion may have a fixed orientation relative to the coupler body 30 or may be movable with respect to the coupler body. The base portion may rotate or pivot with respect to the coupler body around a pivot or rotation axis. The rotation axis may be oriented perpendicular to a long axis of the crossbar 12 and/or parallel to the longitudinal axis of the vehicle.

Base portion 32 may include a base pad configured to make contact with the vehicle feature. The base pad may prevent damage to the vehicle. System 10 may include a variety of base pads with each base pad corresponding to a particular vehicle or set of vehicles and each of the base pads configured to be coupled to the remainder of the base portion.

In some embodiments, vehicle interface 18 may include one or more clips 34 configured to grip or grasp vehicle feature 14. For example, if vehicle feature 14 is a roof rail secured to the top of the vehicle, the vehicle interface may include a pair of clips 34 configured to grip the inboard and outboard sides, respectively, of the roof rail. In examples, if vehicle feature 14 is an edge portion of a naked roof of a vehicle, the vehicle interface may include a single clip 34 configured to grip the edge portion of the roof.

The one or more clips 34 may be of a set of clips, where the specific clip used is chosen for the specific vehicle in question. For example, in cases where vehicle feature 14 is a roof rail, a shape of the selected clips may be adapted to conform to the shape of the inboard and outboard sides of the roof rail. In other examples where the vehicle feature 14 is an edge portion of a naked roof, the shape of the selected clip may be adapted to conform to the edge portion of the roof without interfering with operation of a door.

Vehicle interface 18 may have a common clip retention mechanism 36 capable of receiving and holding any of the set of available clips. Retention mechanism may also be referred to as an adjustment mechanism or assembly 36, as mechanism 36 may allow for adjustment of the one or more clips 34 relative to the coupler body 30. The retention and adjustment mechanism may allow for angular adjustment around a rotation axis, linear adjustment along a translation axis, or a combination of linear and angular adjustment for any or all of the one or more clips 34.

Accordingly, system 10 may allow a user to choose a crossbar 12, select a coupler 16 having a vehicle interface 18 appropriate for attachment to vehicle feature 14 of the user's vehicle, and clamp the crossbar to the support using a corresponding clamp comprising crossbar connector 22 and crossbar seat 26. A user may further couple the vehicle interface to the vehicle feature by adjusting the position of one or more clips 34 with the retention and adjustment mechanism 36.

Figure 2:
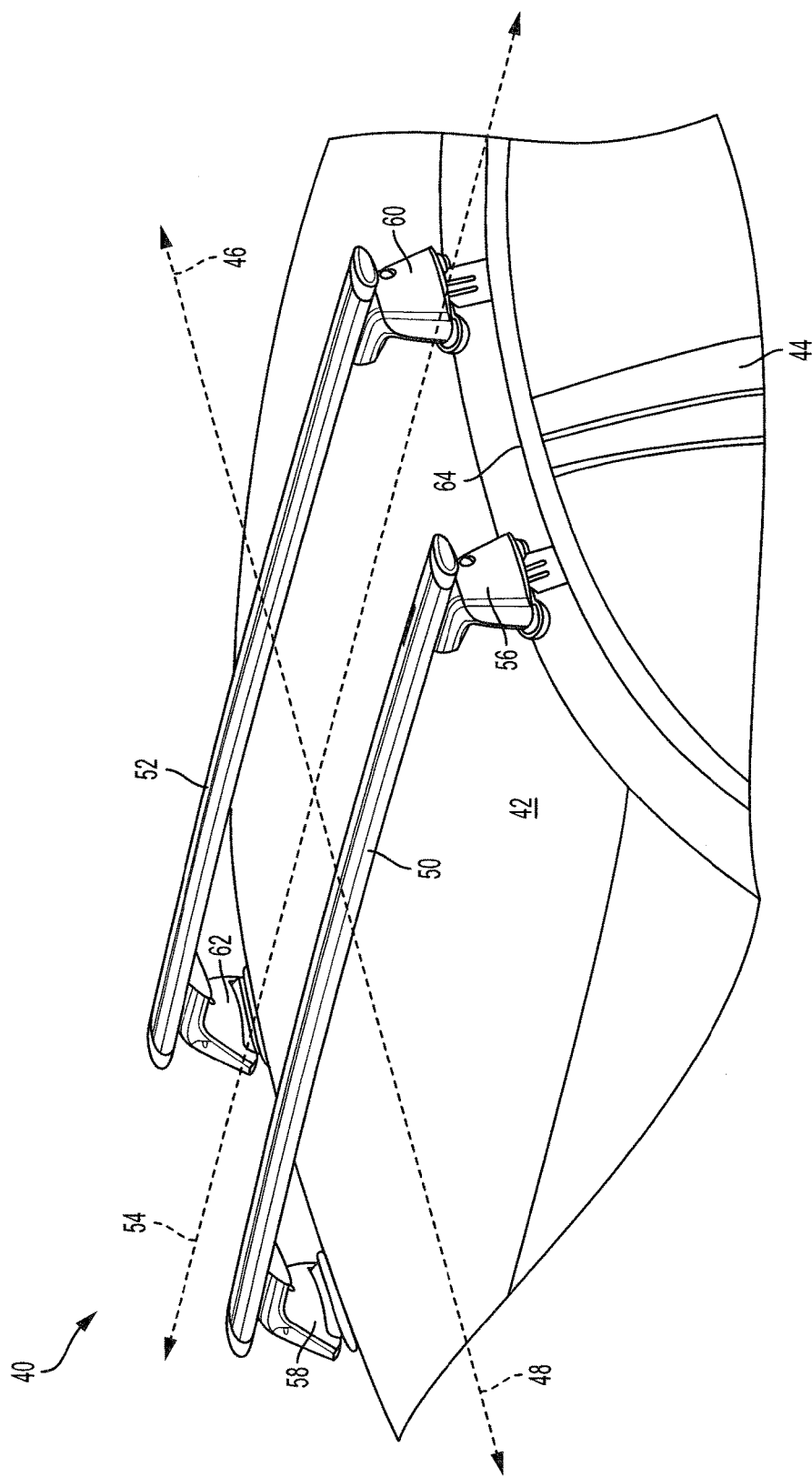
FIG. 2 is an isometric view of an embodiment of a vehicle roof rack system, showing the system attached to the roof of a vehicle.

Turning to FIG. 2, a specific example of a roof rack 40 is depicted, attached to an illustrative roof 42 of a vehicle 44. In this example, roof 42 is a naked or bare roof. That is, roof 42 is free of roof rails and free of fixed anchor points to which a support could be attached. Roof rack 40 is a selected example of roof rack 10, described above. Accordingly, similar components may be labeled with similar reference numbers. Rack 40 may be used for carrying cargo and/or cargo-specific accessories on top of vehicle 44. Vehicle 44 has a longitudinal axis 46 generally coinciding with (e.g., running parallel to) a direction of vehicular travel 48.

Rack 40 includes a pair of crossbars 50 and 52 having aerodynamic shapes. Each crossbar is supported and mounted on vehicle 44 by a respective pair of couplers configured to mount the crossbar on top of the vehicle with the crossbar substantially perpendicular to longitudinal axis 46. Accordingly, crossbars 50 and 52 are substantially parallel to each other and oriented across a width of the vehicle roof, as generally indicated by a lateral axis 54 in FIG. 2. Crossbar 50 is mounted on top of the vehicle by couplers 56 and 58 and crossbar 52 is mounted on top of the vehicle using couplers 60 and 62. In this example, couplers 56, 58, 60, and 62 have a single-clip style vehicle interface configured to clamp or grip a vehicle feature, namely an edge portion of roof 42. Couplers 56 and 60 are configured to grip an edge portion 64 on a first side of the vehicle and couplers 58 and 62 are configured to grip an edge portion, not visible in FIG. 2, on a second side of the vehicle. Other styles may be suitable, and other vehicle features may be present.

EXAMPLES, COMPONENTS, AND ALTERNATIVES

The following sections describe selected aspects of exemplary couplers, crossbar clamp actuators, crossbar clamps, clip retention and adjustment assemblies, and related systems and/or methods. The examples in these sections are intended for illustration and should not be interpreted as limiting the entire scope of the present disclosure. Each section may include one or more distinct inventions, and/or contextual or related information, function, and/or structure.

Illustrative Crossbar Clamps

This example describes how a coupling assembly of a roof rack system can include interchangeable hardware for coupling the coupler body to differently-shaped crossbars, see FIGS. 3-5.

FIG. 3 is an exploded isometric view of roof rack system 40 described above, including crossbar 50 which has an aerodynamic shape. An end cap of the crossbar shown in FIG. 2 is omitted in order to show the cross-sectional shape of crossbar 50, in particular a tee shaped slot or T-slot 70 on an underside of the crossbar. Tee slot 70 runs longitudinally along a length of crossbar 50, and comprises a pair of spaced apart lips 72 and 74 defining a gap (i.e. slot 70) therebetween.

Coupling assembly 56 may include a crossbar clamp 76 including a crossbar connector 78 and a crossbar seat 80. Crossbar connector 78 may include any suitable structure configured to capture (e.g., grasp or grip) crossbar 50, and to be movable relative to crossbar seat 80. Crossbar connector 78 may be interchangeably referred to as a crossbar capturing member or crossbar capturing portion of clamp 76.

Crossbar connector 78 includes a flange portion or tee portion 82 and a stem portion 84. Flange portion 82 is a substantially planar plate or flange sized to slide into tee slot 70. Flange portion 82 has a width that spans T-slot 70, such that bottom surfaces of the flange portion may abut upper surfaces of lips 72 and 74. Stem portion 84 extends or protrudes orthogonally from flange portion 82. Stem portion 84 may be sized such that stem portion 84 can extend through slot 70 when flange portion 82 is inserted in the slot. Accordingly, crossbar connector 78 may freely slide in a longitudinal direction along slot 70 of crossbar 50 when clamp 76 is unclamped.

Crossbar seat 80 may include a block having an aperture 86 running vertically through the block, and through which crossbar connector 78 can at least partially extend. For example, stem portion 84 may extend through aperture 86. In some examples, stem portion 84 may be connectible to a clamp actuator 88, such that the actuator can pull crossbar connector 78 downward through aperture 86. For example, stem portion 84 may include a threaded hole for attaching connector 78 to a crossbar-securing bolt 90 oriented substantially perpendicular to a long axis 92 of the crossbar. This action may cause flange 82 to exert force on lips 72 and 74, pulling crossbar 50 down onto crossbar seat 80, thereby arresting the downward motion of the crossbar connector and clamping the crossbar in place.

Crossbar clamp 78 may be configured to allow a pitch angle adjustment of the crossbar relative to a coupler body 94 of the coupling assembly 56 around the long axis 92 of the crossbar. Crossbar seat 80 may have a lower mating surface 96 shaped to engage or otherwise fit onto a corresponding support surface 98 of the coupler 56. Lower mating surface 96 may include one or more additional features, such as discrete positioning teeth configured to mate with corresponding teeth or features on the support surface of the coupler. These features may allow the crossbar seat to sit on the coupler at a variety of orientations around the long axis of the crossbar before the crossbar has been clamped, as indicated by curved arrow 100. Once the desired pitch angle has been achieved, the crossbar may then be secured to the coupler by actuating the crossbar-securing bolt 90.

FIG. 4 is an exploded isometric view of roof rack system 40 described above, including a round crossbar 110. Coupler 56 may include a clamp 112 including a crossbar connector 114 and a crossbar seat 116. Crossbar connector 114 may include any suitable structure configured to capture (e.g., grasp or grip) crossbar 110, and to be movable relative to crossbar seat 116, such that the captured crossbar can be urged or forced against the crossbar seat. Crossbar connector 114 may be interchangeably referred to as a crossbar capturing member or crossbar capturing portion of clamp 112.

Crossbar seat 116 may include any suitable structure configured to cradle crossbar 110 on a seating surface 118 that generally conforms to an outer surface 120 of the crossbar. Crossbar seat 116 may be described as an anvil or a fixed jaw. In some examples, seating surface 118 may include a resilient, compressible, and/or compliant layer, such as a rubber coating, to reduce damage to crossbar 110.

In this example, crossbar connector 114 includes a sleeve portion 122 and a stem portion 124. Sleeve portion 122 is a substantially cylindrical tube or collar generally conforming to but slightly larger than an outer diameter of the round crossbar. Sleeve portion 122 may freely slide on crossbar 110. Stem portion 124 extends or protrudes radially from an outer surface of sleeve portion 122. Stem portion 124 may include a fastening mechanism, such as a threaded hole, for attaching connector 114 to clamp actuator 88.

Crossbar seat 116 includes a block having an aperture 126 running vertically through the block, and through which crossbar connector 114 can at least partially extend. For example, stem portion 124 may extend through aperture 126. In some examples, stem portion 124 may be connectible to actuator 88, such that the actuator can pull crossbar connector 114 downward through aperture 126. This action causes crossbar 110 to be pulled down onto crossbar seat 116, thereby arresting the downward motion of the crossbar connector and clamping the crossbar in place. In some examples, crossbar 102 may be a steel crossbar and sleeve portion 112 may comprise aluminum.

Crossbar seat 116 is supported on the coupler. Accordingly, a lower mating surface 128 may be shaped to engage or otherwise fit onto a corresponding support surface of the coupler (e.g., support surface 98 described above with respect to FIG. 3). As described above regarding similar crossbar seats, lower mating surface 128 may include one or more additional features, such as discrete positioning teeth, a selected curvature, etc.

FIG. 5 is an exploded isometric view of roof rack system 40 described above, including an aerodynamic (also referred to as "aero") or teardrop shaped crossbar 140, and a clamp 142 of coupling assembly 56. An end cap of crossbar 140 is omitted in order to show the cross-sectional shape of the crossbar. Aero crossbar 140 may or may not include a lower T-slot, similar to crossbar 50. However, crossbars having lower T-slots frequently also have such slots on upper surfaces, and clamp 142 may interfere with these upper slots. Accordingly, it may be desirable to use clamp 76 rather than clamp 142 in some examples, and vice versa.

Clamp 142 includes a crossbar seat 144 and a crossbar connector 146, both of which are similar to their corresponding components in clamp 112. Crossbar seat 144 may include any suitable structure configured to cradle crossbar 140 on a seating surface 148 that generally conforms to an outer surface 150 of the crossbar. Crossbar seat 144 may be described as an anvil or a fixed jaw. In some examples, seating surface 148 may include a resilient, compressible, and/or compliant layer, such as a rubber coating, to reduce damage to crossbar 140.

Crossbar connector 146 may include any suitable structure configured to capture (e.g., grasp or grip) crossbar 140, and to be movable relative to crossbar seat 144, such that the captured crossbar can be urged against seating surface 148. Crossbar connector 146 may be interchangeably referred to as a crossbar capturing member or crossbar capturing portion of clamp 142.

In this example, crossbar connector 146 includes a sleeve portion 152 and a stem portion 154. Sleeve portion 152 is a substantially teardrop-shaped or airfoil-shaped tube or collar generally conforming to but slightly larger than an outer shape of the aero crossbar. Sleeve portion 152 may freely slide on crossbar 140. Stem portion 154 extends or protrudes outward from an outer surface of sleeve portion 152. Stem portion 154 may include a fastening mechanism, such as a threaded hole, for attaching connector 146 to clamp actuator 88.

Crossbar seat 144 includes a block having an aperture 156 running vertically through the block, and through which crossbar connector 146 can at least partially extend. For example, stem portion 154 may extend through aperture 156. In some examples, stem portion 154 may be connectible to actuator 88, such that the actuator can pull crossbar connector 146 downward through aperture 156. This action causes crossbar 140 to be pulled down onto crossbar seat 144, thereby arresting the downward motion of the crossbar connector and clamping the crossbar in place.

Crossbar seat 144 is supported on the coupler 56. Accordingly, a lower mating surface 158 may be shaped to engage or otherwise fit onto a corresponding support surface of the coupler (e.g., support surface 98 described above with respect to FIG. 3). As described above regarding similar crossbar seats, lower mating surface 158 may include one or more additional features, such as discrete positioning teeth, a selected curvature, etc., thereby allowing a pitch angle adjustment of the crossbar 140 relative to the coupler body 160 around a long axis 162 of the crossbar.

Biaxial Clip Adjustment

Figure 7:
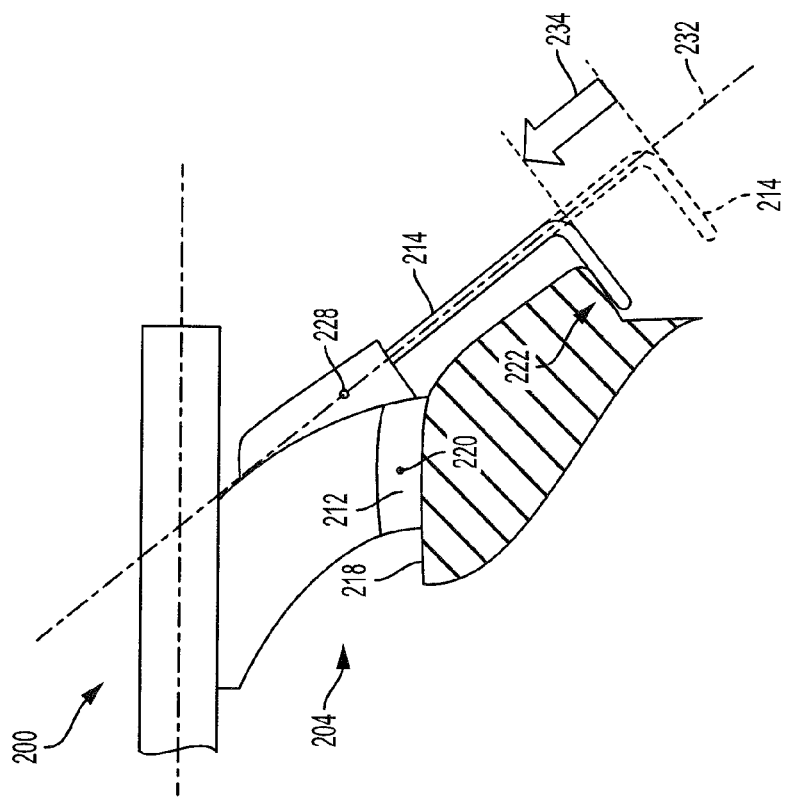
FIG. 7 is a schematic illustration of the vehicle roof rack system of FIG. 6, showing a linear adjustment of the clip along a translation axis.
Figure 6:
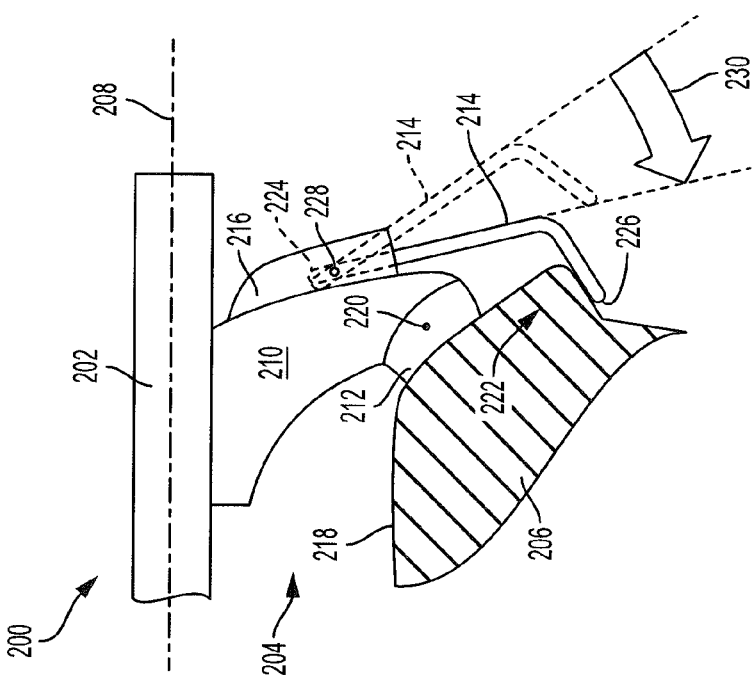
FIG. 6 is a schematic illustration of a vehicle roof rack system, showing an angular adjustment of a clip around a rotation axis.

This example describes an illustrative coupling assembly including a clip retention and adjustment mechanism configured to independently allow angular adjustment of a clip around a rotation axis and linear adjustment of the clip along a longitudinal axis, see FIGS. 6 and 7.

FIG. 6 is a schematic illustration of a vehicle roof rack system, generally indicated at 200. System 200 may include a crossbar 202 and a pair of coupling assemblies, one of which is indicated at 204. Coupling assembly 204, also referred to as a coupler, is configured to mount the crossbar on top of a vehicle 206 such that a long axis 208 of the crossbar is substantially horizontal and perpendicular to a longitudinal axis of the vehicle.

Coupling assembly 204, which may be similar to couplers 16 and/or 56 described above, may include a coupler body 210, a base portion 212, a clip 214, and a clip retention and adjustment mechanism or assembly 216. Base portion 212 is configured to sit on or abut a roof 218 of vehicle 206. Base portion 212 may be configured to rotate with respect to the coupler body 210 about a base pivot axis 220 oriented parallel to the longitudinal axis of the vehicle, see at 48 in FIG. 2. Rotation of the base portion may facilitate proper seating of the base portion on the roof or may facilitate the base portion sitting at more than one location on the roof.

Clip 214, which may be similar to the one or more clips 34 described above, is configured to grip an edge portion 222 of the roof 218 of the vehicle 206. Clip 214 may be one of a set of clips configured to be releasably coupled to the clip retention and adjustment mechanism 216. Each of the set of clips may be configured to grip the corresponding edge portion of a roof for one or more vehicles. Each of the set of clips may have a common configuration proximate a proximal end 224 of the clip, the proximal end being received by the retention and adjustment mechanism 216, and a unique configuration proximate a distal end 226 of the clip, with the shape of the distal end configured to be complementary to the edge portion 222 of one or more roofs.

The clip retention and adjustment mechanism 216 is configured to allow angular adjustment of clip 214 around a rotation axis 228 which is perpendicular to the long axis 208 of the crossbar. Rotation axis 228 may be substantially parallel to the base pivot axis 220 and/or the longitudinal axis of the vehicle. The angular motion of clip 214 is indicated by curved arrow 230 between a dashed-line version of clip 214 and a solid-line version of clip 214.

FIG. 7 is a schematic illustration of vehicle roof rack system 200. In FIG. 7, the base portion 212 of the coupling assembly 204 is sitting at a different location on the roof 218 as compared to FIG. 6. As compared to FIG. 6, the base portion 212 has rotated around the base pivot axis 220 in order to sit flush on the roof.

Clip retention and adjustment assembly 216 is configured to allow linear adjustment of the clip 214 along a translation axis 232 which is perpendicular to the rotation axis 218. The linear motion of clip 214 is indicated by straight arrow 234 between a dashed-line version of clip 214 and a solid-line version of clip 214.

As is shown in FIGS. 6 and 7, the coupling assembly 204 is configured to rotate the clip 214 around rotation axis 218 and move the clip along translation axis 232. The clip may grip the edge portion 222 of the root through any combination of these two movements. That is, the clip may perform only angular rotation, only linear movement, or any combination of angular rotation and linear movement.

Illustrative Coupling Assembly

This example describes an illustrative embodiment of a coupling assembly, generally indicated at 300 in FIGS. 8-14, suitable for use in connecting a rooftop cargo carrying system to a vehicle. The coupling assembly described in this section is an example of coupler 16 described above, and is similar to couplers 56 and 204 described above.

Figure 8:
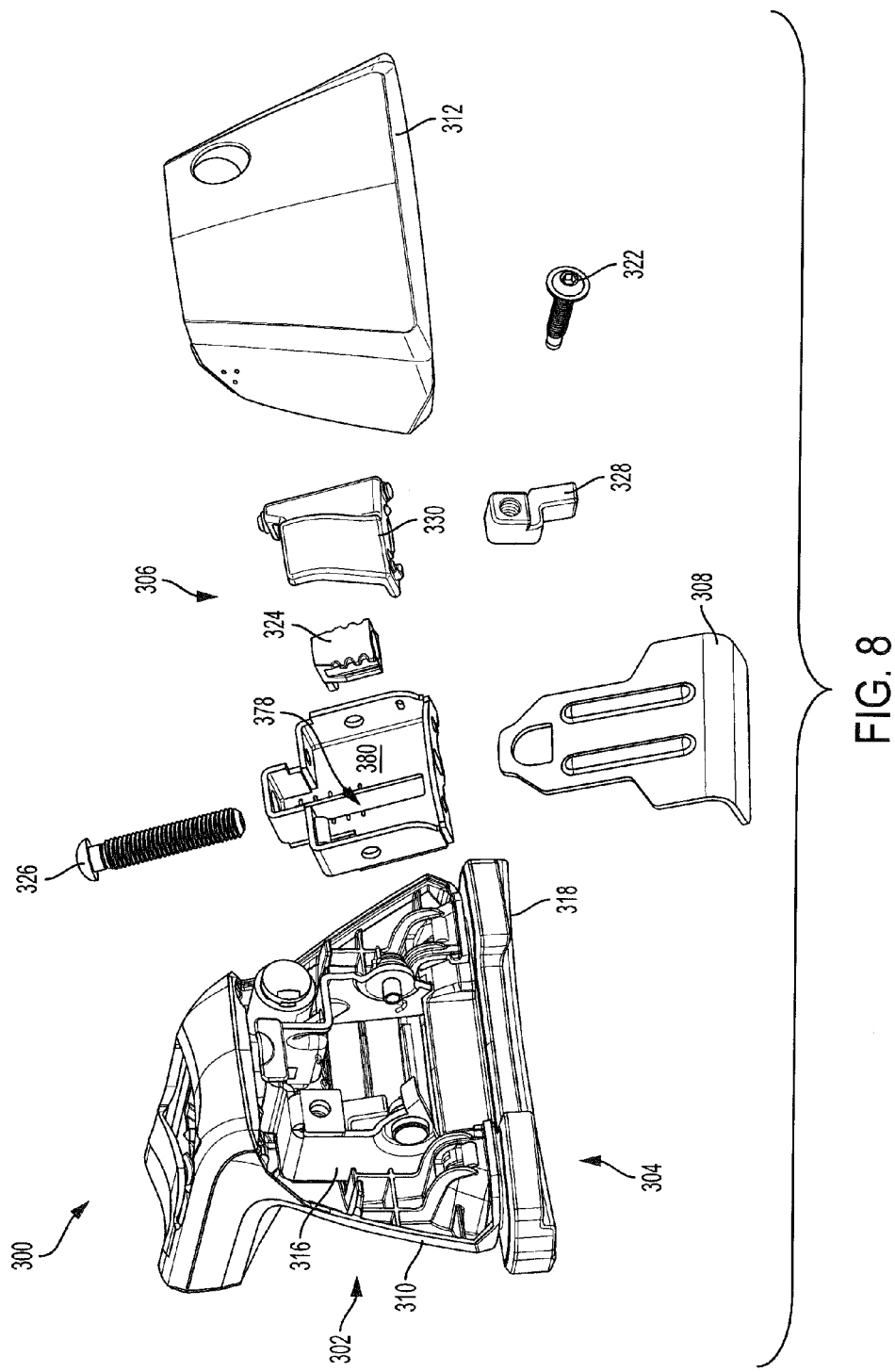
FIG. 8 is an exploded view of an embodiment of a coupling assembly of a vehicle roof rack system.

FIG. 8 shows an exploded view of coupling assembly 300. Coupling assembly may include a coupler body 302, a base portion 304, a clip retention and adjustment mechanism or assembly 306, and a clip 308. Coupling assembly 300 may include a crossbar clamp, not shown in FIG. 8, configured to be coupled to a crossbar as described in reference to FIGS. 1-5.

Figure 14:
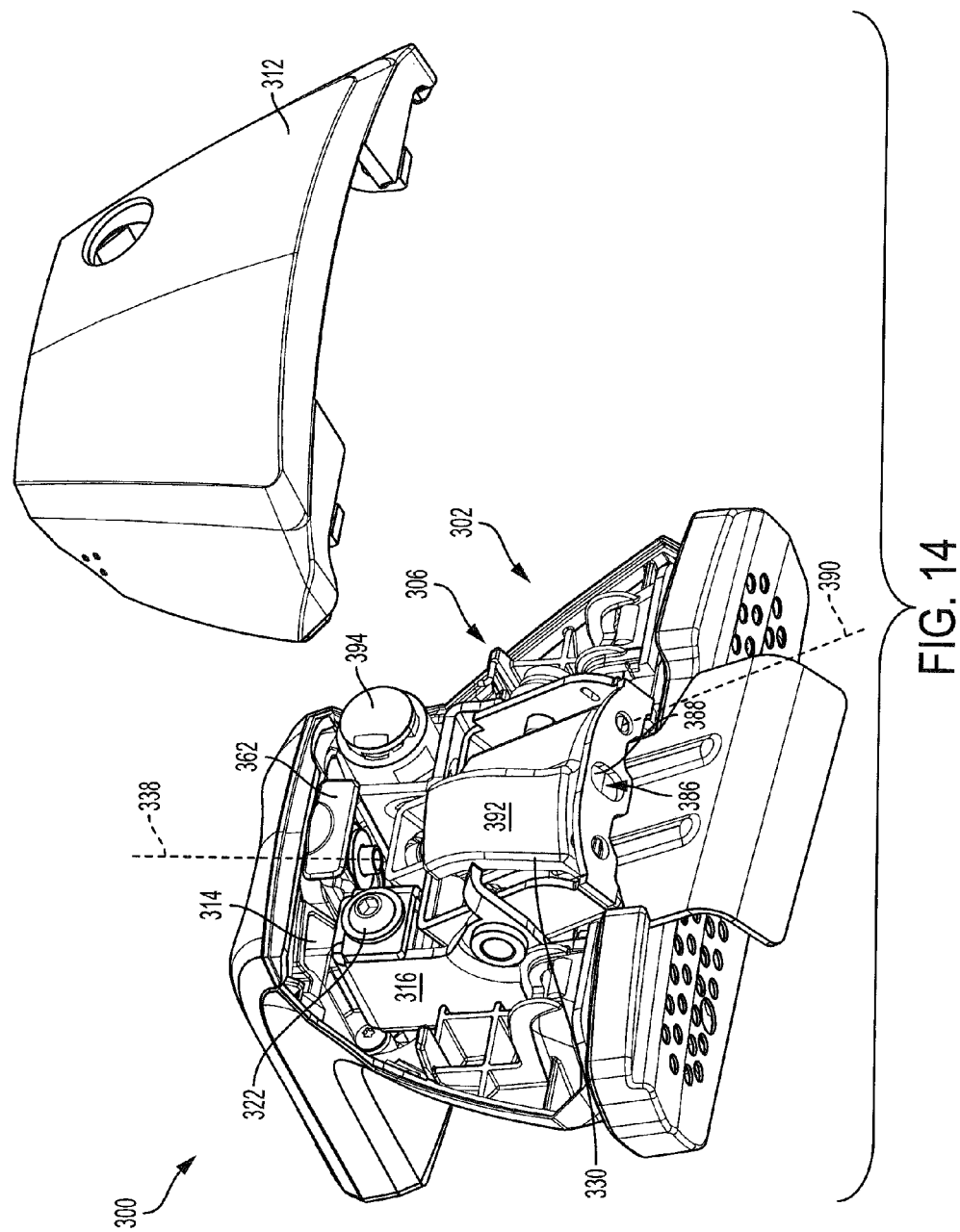
FIG. 14 is a lower perspective view of a portion of the coupling assembly of FIG. 8, showing a security door in a secured position.

Coupler body 302 may include an inner cover 310, a removable outer cover 312, an upper frame 314 best seen in FIG. 14, and a lower frame 316. Together, the inner and outer covers may protect portions of the coupling assembly 300 against dirt, wind, rain, and other elements and may prevent unwanted access to other components of the coupling assembly. The upper and lower frames may provide structural support for the coupling assembly. The upper and lower frames may be pivotally mounted to one another, thereby allowing a toe angle adjustment of the coupling assembly, described further in reference to FIGS. 9 and 14.

Base portion 304 may include a base pad 318 configured to make contact with the roof of the vehicle. Base pad 318 may be constructed of a resiliently deformable material, such as rubber, and may prevent damage to the roof. The base pad may be one of an interchangeable set of base pads, with each base pad configured to be coupled to the base portion and configured to be used on the roof of a particular vehicle or set of vehicles.

Clip retention and adjustment mechanism 306 includes a carriage 320, a first actuator 322, a catch 324, and a second actuator 326. The clip retention and adjustment mechanism may further include a traveler 328 and a security door 330. The carriage is configured to releasably receive the clip 308 and to rotate around a rotation axis oriented parallel to the direction of vehicle travel. The first actuator 322 is configured to rotate the carriage 320 around the rotation axis, as described below in reference to FIGS. 9 and 10. The catch 324 is configured to releasably engage an aperture in the clip, as described below in reference to FIGS. 11-13. The second actuator 326 is configured to move the catch and the clip relative to the coupler body 302 along a translation axis, as described below in reference to FIGS. 11-13.

Figure 9:
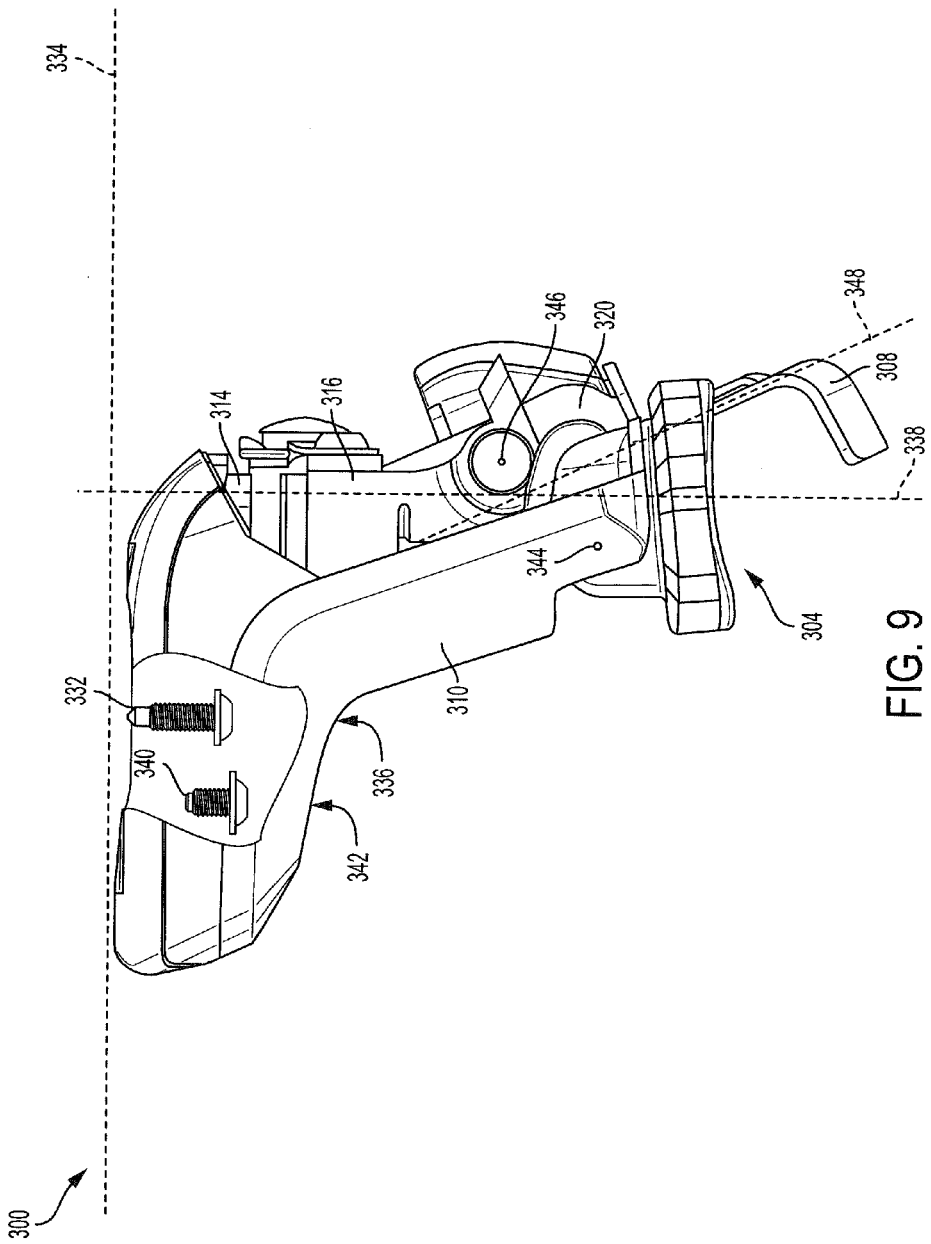
FIG. 9 is a side view of the coupling assembly of FIG. 8, with an outer cover removed.

FIG. 9 is a side view of coupling assembly 300 without the removable outer cover 312 seen in FIG. 8. Coupling assembly 300 may include a crossbar-securing bolt 332, visible in FIG. 9 through the partially transparent inner cover 310. Crossbar securing bolt 332 may be oriented perpendicular to a long axis 334 of the crossbar, the crossbar not shown in FIG. 9; see, for example, FIGS. 3-5. Inner cover 310 may include an aperture 336 disposed proximate the crossbar-securing bolt, with aperture 336 providing access to the crossbar-securing bolt.

Coupling assembly 300 may be configured to allow a toe angle adjustment of the base portion 304 and the lower frame 316 which may be coupled to the base portion. The lower frame 316 may be pivotally mounted to the upper frame 314 so that the lower frame can rotate with respect to the upper frame around a toe axis 338. The toe axis 338 may be perpendicular to the long axis 334 of the crossbar and the longitudinal axis of the vehicle shown at 46 in FIG. 2. Rotating the lower frame around the toe axis 338 relative to the upper frame may adjust the toe angle of the base portion and the lower frame relative to the crossbar.

Coupling assembly 300 may include a toe-angle-securing bolt 340 which may prevent motion of the lower frame 316 relative to the upper frame 314 when bolt 340 is tightened. The toe-angle-securing bolt may be accessed via an aperture 342 in the inner cover 310. The lower frame and the upper frame may be configured to hold a continuum of relative positions, i.e. toe angles. Alternately, the lower frame and the upper frame may be configured to hold a discrete plurality of relative positions. For example, the lower frame may be secured at any one of three discrete toe angles relative to the upper frame.

Base portion 304 may be configured to rotate with respect to the coupler body 302 about a base pivot axis 344 oriented parallel to the longitudinal axis of the vehicle. Base pivot axis 344 is perpendicular to the view of FIG. 9 and may be oriented perpendicular to the long axis 334 of the crossbar and perpendicular to the toe axis 338.

Carriage 320 may be pivotally mounted to the coupler body 302 and configured to rotate around a rotation axis 346 oriented parallel to the longitudinal axis of the vehicle. The rotation axis 346 may be parallel to and spaced from the base pivot axis 344. Clip 308 may be configured to move along a translation axis 348 oriented perpendicular to the rotation axis 346.

Figure 10:
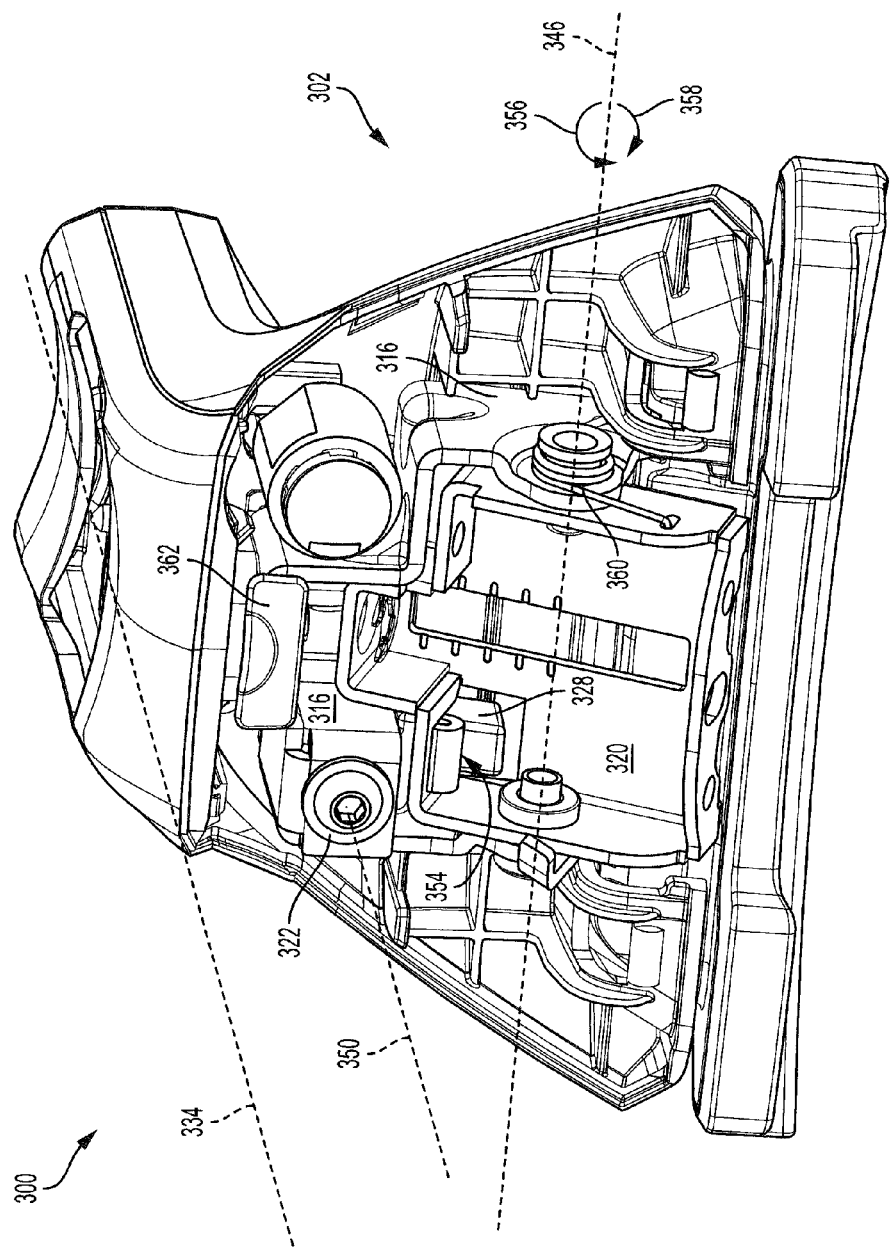
FIG. 10 is a perspective view of a portion of the coupling assembly of FIG. 8, showing a carriage pivotally mounted to a coupler body and a first actuator configured to rotate the carriage around a rotation axis.

FIG. 10 is a perspective view of a portion of coupling assembly 300. Carriage 320 may be pivotally mounted to the lower frame 316 of the coupler body 302 and configured to rotate around the rotation axis 346.

First actuator 322 may be configured to rotate the carriage 320 around the rotation axis 346. The first actuator may be a threaded bolt oriented parallel to the long axis 334 of the crossbar and may be configured to rotate about an axis indicated at 350. Rotating the threaded bolt around axis 350 may cause the carriage to rotate around the rotation axis 346. The first actuator may be accessed by a user from the outboard side of the coupling assembly 300 when the outer cover is removed.

Traveler 328 may have a threaded aperture 352, seen best in FIG. 8, configured to receive the threaded bolt 322. The traveler may be configured to move along the first actuator and along axis 350 when the first actuator rotates. The traveler may move in inboard and outboard directions depending on the direction of rotation of the threaded bolt 322.

When traveler 328 moves in an outboard direction along axis 350, the traveler may make contact with carriage 320 at a location 354 above the rotation axis 346 and may exert a contact force on the carriage directed in an outboard direction. That is, the traveler may exert a torque on the carriage about the rotation axis 346 which may cause the carriage to rotate around the rotation axis as the traveler moves. As the traveler moves in an outboard direction, the carriage may rotate around the rotation axis in a direction indicated by curved arrow 356. As the traveler moves in an inboard direction, the carriage may rotate around the rotation axis in a direction indicated by curved arrow 358.

The clip retention and adjustment mechanism may include a biasing member 360, for example a spring, configured to urge the clip to rotate around the rotation axis 346 toward an open position. That is, the biasing member may urge the carriage 320 which received the clip to rotate around the rotation axis. Direction 358 may be considered to be toward an open position. Actuating the first actuator 322 may cause the carriage to rotate in direction 356 against the urging of the biasing member 360. Actuating the first actuator in the opposite direction may allow the carriage to rotate in direction 358 at the urging of the biasing member.

In some examples, clip 308 may have an angle of closest approach relative to the coupler body, that is, a maximally closed position relative to the coupler body. When the clip retention and adjustment mechanism is configured so that the clip is disposed at the angle of closest approach relative to the coupler body, the translation axis 348 of the clip may be approximately ten degrees from a vertical axis such as the vertical toe axis 338, see FIG. 9.

In some examples, clip 308 may have an angle of farthest departure relative to the coupler body, that is, a maximally open position relative to the coupler body. When the clip retention and adjustment mechanism is configured so that the clip is disposed at the angle of farthest departure, the translation axis 348 of the clip may be approximately sixty degrees from a vertical axis such at the vertical toe axis 338 shown in FIG. 9. That is, relative to a vertical axis, clip 308 may take any angular position between ten degrees from vertical and sixty degrees from vertical, though other ranges are also possible.

Referring now to the toe angle adjustment described in reference to FIG. 9, coupling assembly 300 may include a security drawer 362 shown in FIG. 10. Security drawer 362 may be configured to move in a direction parallel to the crossbar axis 300. The security drawer may include an inwardly projecting flange configured to alternately block and permit access to the crossbar securing bolt 332 through aperture 336 as is shown in FIG. 9. When the security drawer is in an inboard position, aperture 336 may be blocked by the inwardly projecting flange. When the security drawer is in an outboard position, crossbar-securing bolt 332 may be accessible through aperture 336. When the security drawer is in the inboard position and the removable outer cover 312 is in a secured position, as shown in FIGS. 3-5, undesired removal of the crossbar may be prevented.

Figure 11:
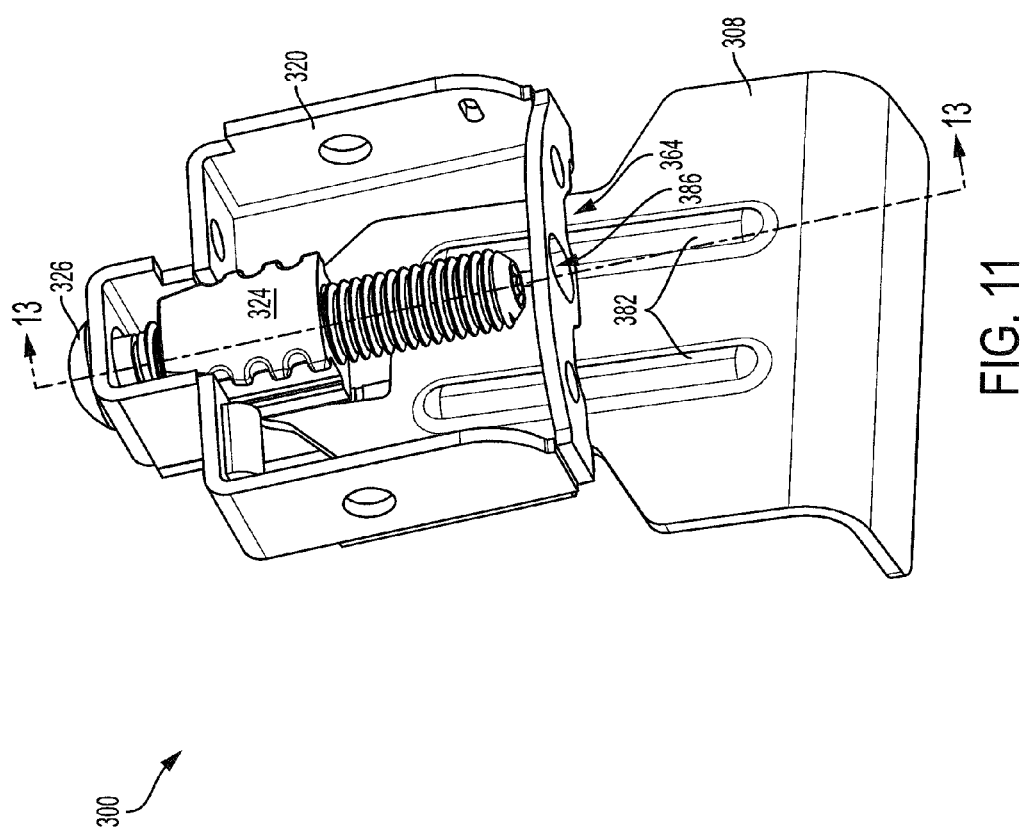
FIG. 11 is a perspective view of a portion of the coupling assembly of FIG. 8, showing a catch configured to releasably engage a clip and a second actuator configured to move the catch and the clip relative to the carriage.
Figure 12:
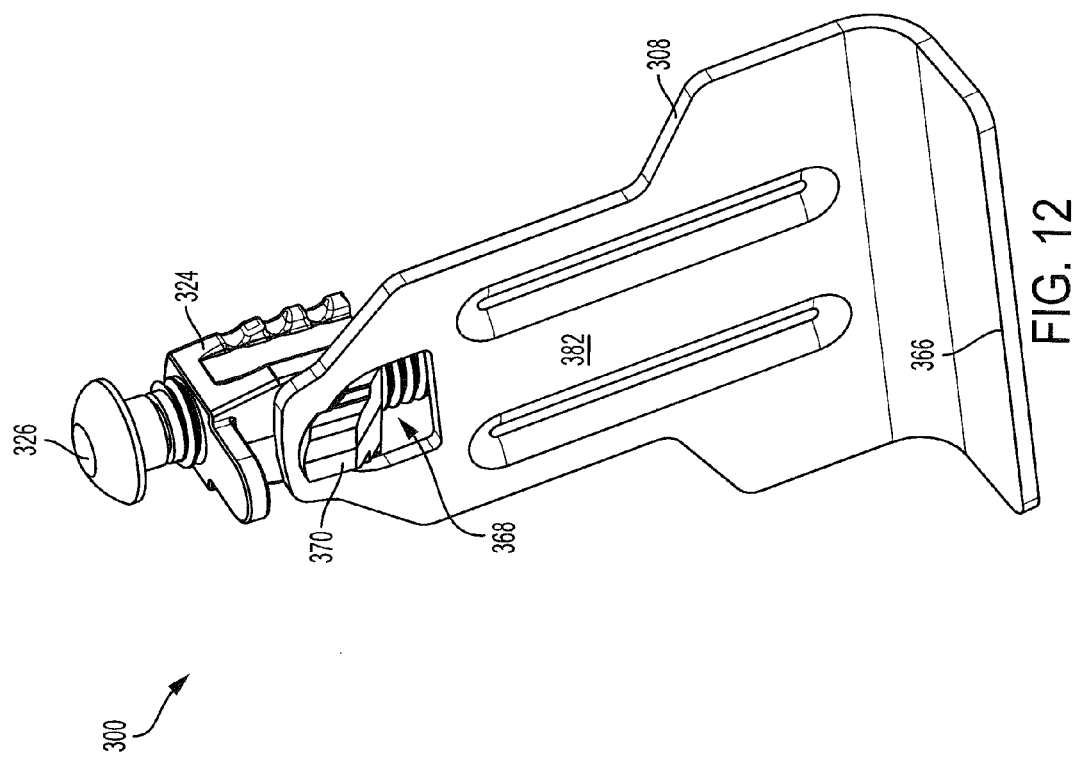
FIG. 12 is a rear perspective view of a portion of the coupling assembly of FIG. 8, showing a hook portion of the catch disposed in an aperture of the clip.
Figure 13:
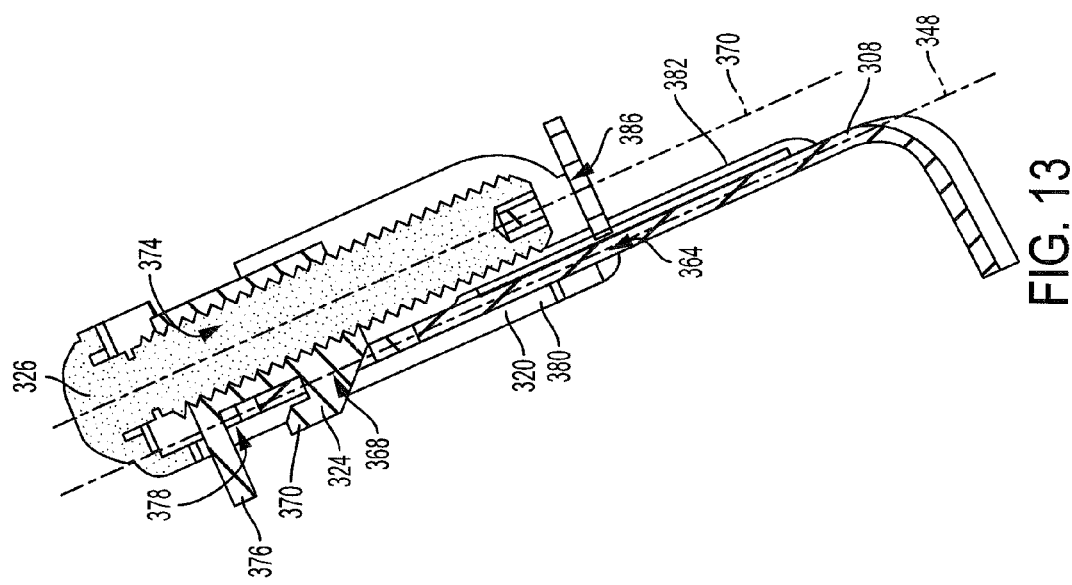
FIG. 13 is a cross-sectional view a portion of the coupling assembly of FIG. 8, taken at plane 13-13 in FIG. 11.

FIG. 11 is a perspective view from the outboard side of the carriage 320, the catch 324, the second actuator 326, and the clip 308. FIG. 12 is a perspective view from the inboard side of the clip, the catch, and the second actuator. FIG. 13 is a cross-sectional view, taken at 13-13 in FIG. 11. FIGS. 11, 12, and 13 are herein described as a group to illustrate the translational movement of the clip relative to the carriage.

Carriage 320 has a slot 364 for receiving clip 308 along the translation axis 348. Clip 308 may be one of a set of clips configured to be releasably coupled to the clip retention and adjustment mechanism. The clip may be shaped proximate a distal end 366 of the clip in order to properly grip an edge portion of a vehicle. The different clips in the set of clips may have different shapes to accommodate different vehicles.

Catch 324 is configured to releasably engage an aperture 368 in the clip 308. The catch may have a hook portion 370 projecting from an inboard side of the catch and the hook portion may be configured to releasably engage the aperture in the clip.

Second actuator 326 is configured to move catch 324 and clip 308 relative to the coupler body along the translation axis 348. In particular, the second actuator is configured to move the catch and the clip relative to carriage 320 along the translation axis. As the carriage is pivotally mounted to the coupler body, moving the catch and clip relative to the carriage will also include moving the catch and clip relative to the coupler body.

The second actuator 326 may be a threaded bolt oriented parallel to translation axis 348 of the clip 308, with the threaded bolt configured to rotate around an axis, indicated at 372, parallel to the translation axis. Catch 324 may have a threaded aperture 374 through which the second actuator passes. Catch 324 may be configured to move along the second actuator when the second actuator rotates around axis 372. As the catch moves along the second actuator, the clip may also move along the actuator and along the translation axis 348, either toward or away from the coupler body depending on the direction of rotation of the second actuator. In some examples, catch 324 and clip 308 may be configured to move along the translation axis a distance of approximately twenty five millimeters, though other translation distances are also possible.

Catch 324 may include an inboard projection 376 and carriage 320 may have a long aperture 378 in a back panel 380 of the carriage, see for example in FIG. 8. The inboard projection of the catch may be configured to project through the long aperture in the back panel of the carriage, thereby preventing rotation of the catch around the axis 372 and allowing the catch to travel along the second actuator 326 when the second actuator rotates.

Clip 308 may include one or more longitudinal ridges 382 extending from a body 384 of the clip. The longitudinal ridges may provide the body of the clip with more stiffness or resistance to bending than the body would have without the ridges. Slot 364 may have a shape configured to accommodate the insertion and removal of clip 308 with longitudinal ridges 382.

Carriage 320 may include a translation access aperture 386 through which a user may access the second actuator 326 with an actuating device. In the case where the second actuator is a threaded bolt, a user may turn the threaded bolt by inserting, for example, a hexagonal wrench through translation access aperture 386 and turning the wrench.

FIG. 14 is a lower perspective view of coupling assembly 300 with removable outer cover 312 in an unattached position and security door 330 in a secured position. Security door 330 may have a secured position relative to the clip retention and adjustment mechanism 306. When security door 330 is in the secured position, access to the second actuator may be prohibited. For example, security door 330 may have a lower end 388 which substantially obscured translation access aperture 386 when the security door is in the secured position. Obscuring the translation access aperture may prevent access to the threaded bolt of the second actuator. Preventing access to the second actuator may prevent undesired removal of the coupling assembly 300 from the vehicle.

Security door 330 may have an unsecured position relative to the clip retention and adjustment mechanism 306. When security door 330 is in the unsecured position, access to the second actuator may be permitted. In the unsecured position, the security door may be rotated by ninety degrees about axis 390 relative to the secured position. Axis 390 may be substantially parallel to the translation axis 348 shown, for example, in FIG. 13. That is, security door 330 may swing open and closed about axis 390. Permitting access to the second actuator may facilitate desired installation and/or removal of the coupling assembly 300 from the vehicle.

The removable outer cover 312 may have a secured position relative to the coupler body 302 in which security door 330 is held in the secured position of the security door. The secured position of the removable outer cover may be seen, for example in FIGS. 3-5. In the secured position, the outer cover may be disposed proximate an outer surface 392 of the security door, thereby preventing opening of the security door and also preventing access to the second actuator.

When the outer cover 312 is in the secured position, access to the first actuator 322 may be prohibited. Preventing access to the first actuator may prevent undesired removal of the coupling assembly from the vehicle. Further, when the outer cover 312 is in the secured position, access to the security drawer 362 may be prohibited. Preventing access to the security drawer may prevent undesired access to the crossbar of the roof rack system. Coupling assembly 300 may include a locking mechanism 394. Via the locking mechanism a user may alternately prevent and allow removal of the removable outer cover 312.

Referring again to the toe angle adjustment described in reference to FIGS. 9 and 10, the toe axis 338 about which lower frame 316 can rotate relative to upper frame 314 can be seen in FIG. 14.

Illustrative Method

Figure 15:
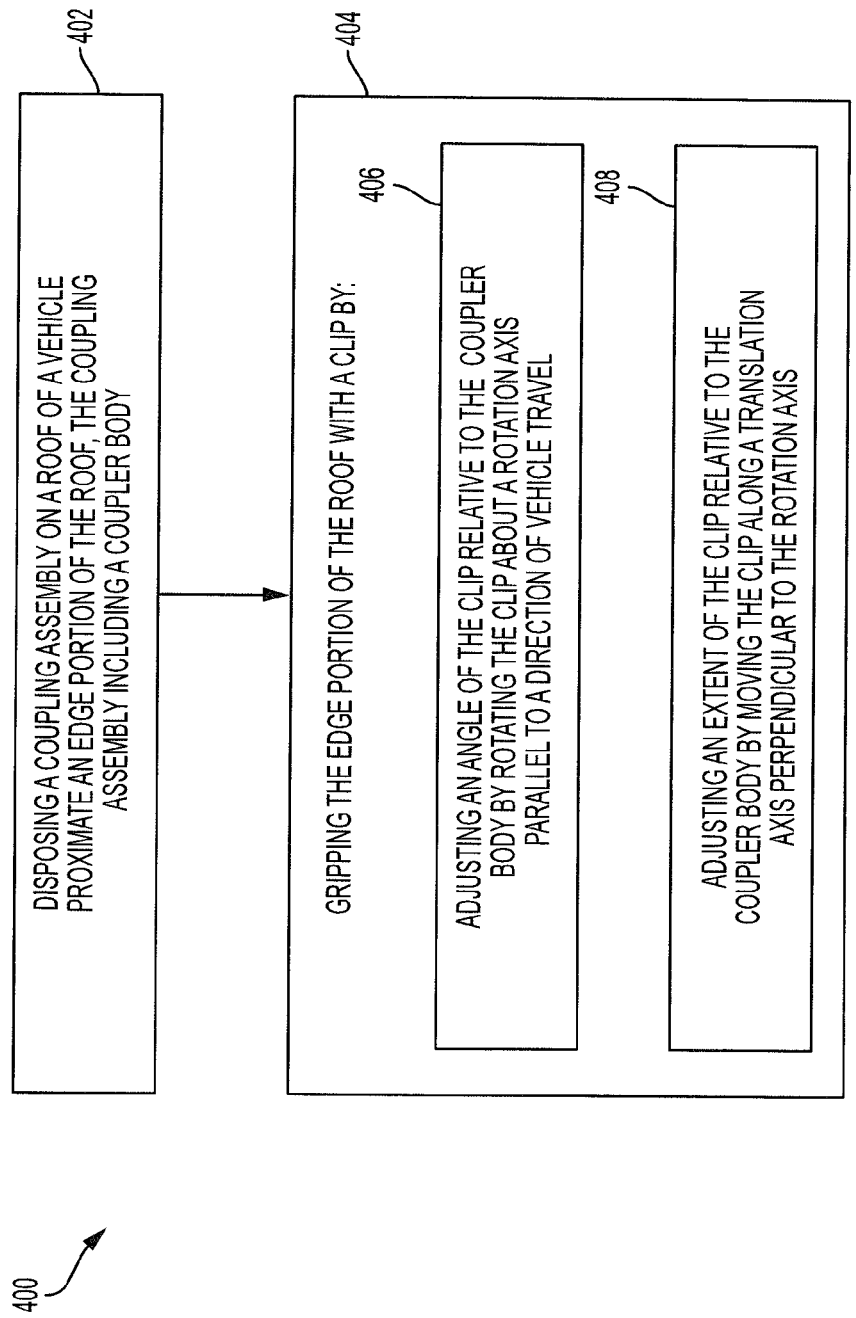
FIG. 15 is a flow chart depicting a method of removably attaching a coupling assembly to a roof of a vehicle, the coupling assembly for use in a rooftop cargo carrying system.

This section describes steps of an illustrative method for removably attaching a coupling assembly to a roof of a vehicle, the coupling assembly for use in a rooftop cargo carrying system; see FIG. 15. Aspects of crossbars, couplers, and/or actuators described above may be utilized in the method steps described below. Where appropriate, reference may be made to previously described components and systems that may be used in carrying out each step. These references are for illustration, and are not intended to limit the possible ways of carrying out any particular step of the method.

FIG. 15 is a flowchart illustrating steps performed in an illustrative method, and may not recite the complete process or all steps of the method. FIG. 15 depicts multiple steps of a method, generally indicated at 400, which may be performed in conjunction with crossbar-to-vehicle coupling systems and devices according to aspects of the present disclosure. Although various steps of method 400 are described below and depicted in FIG. 15, the steps need not necessarily all be performed, and in some cases may be performed in a different order than the order shown.

Method 400 may include a step 402 of disposing a coupling assembly (e.g. coupler 16, coupling assembly 56, coupling assembly 204, coupling assembly 300) on a roof of a vehicle proximate an edge portion of the roof, with the coupling assembly including a coupler body. The coupling assembly may further include a base portion connected to the coupler body, with the base portion abutting the roof of the vehicle. Disposing the coupling assembly on the roof of the vehicle may include adjusting an angle of the base portion relative to the coupler body. The base portion may be configured to rotate around a base pivot axis oriented parallel to the direction of vehicle travel. Adjusting the angle of the base portion relative to the coupler body may allow the coupling assembly to sit properly on the roof. A coupling assembly including an adjustable base portion may accommodate many different roofs having many different configurations.

Method 400 may include a step 404 of gripping the edge portion of the roof with a clip (e.g. one or more clip(s) 34, clip 214, clip 308). Step 404 may include a substep 406 of adjusting an angle of the clip relative to the coupler body by rotating the clip about a rotation axis (e.g. rotation axis 228, rotation axis 346) oriented parallel to a direction of vehicle travel. Step 404 may include a substep 408 of adjusting an extent of the clip relative to the coupler body by moving the clip along a translation axis (e.g. translation axis 232, translation axis 348) perpendicular to the rotation axis. That is, gripping the edge portion of the roof may include adjusting the angle of the clip relative to the coupler body and by adjusting the extent of the clip relative to the coupler body. Adjusting the angle of the clip may be independent of adjusting the extent of the clip. Gripping the edge portion of the roof may prevent relative motion of the coupling assembly and the roof of the vehicle. That is, gripping the edge portion of the roof may attach the coupling assembly to the roof.

Method 400 may optionally include a step of coupling a crossbar to the coupling assembly via a crossbar clamp (e.g. clamp 24, clamp 76, clamp 112, clamp 142) connected to the coupler body. The crossbar may have a long axis oriented transverse to a direction of vehicle travel. Coupling the crossbar to the coupling assembly may include adjusting a pitch angle of the crossbar relative to the coupler body by rotating the crossbar around the long axis of the crossbar. Coupling the crossbar to the coupling assembly may include adjusting a toe angle of the coupling assembly by rotating the base portion relative to the crossbar around a toe axis perpendicular to the long axis of the crossbar and the direction of vehicle travel.

In the case where method 400 includes coupling a crossbar to the coupling assembly, step 402 of disposing the coupling assembly on the roof of the vehicle may include adjusting the relative disposition of coupling assembly and the crossbar along the long axis of the crossbar. This may ensure that the coupling assembly abuts the roof at an appropriate location.

After any combination of adjusting the pitch angle, adjusting the toe angle, or adjusting the relative position of the coupling assembly and the crossbar has been performed, method 400 may include a step of actuating a crossbar-securing bolt oriented perpendicular to the long axis of the crossbar. Actuating the crossbar-securing bolt may prevent further relative motion of the crossbar and the coupling assembly, thereby locking the crossbar in place relative to the coupling assembly.

Method 400 may optionally include removably coupling the clip to a clip retention and adjustment mechanism (e.g. retention and adjustment mechanism 36, clip retention and adjustment mechanism 216, clip retention and adjustment mechanism 306) connected to the coupler body. Removably coupling the clip may include inserting the clip into a carriage of the clip retention and adjustment mechanism. The carriage may be pivotally mounted to the coupler body and configured to rotate around the rotation axis relative to the coupler body. The carriage may have a slot for receiving the clip along the translation axis.

The clip retention and adjustment mechanism may include a threaded bolt as a first actuator and a traveler having a threaded aperture configured to receive the threaded bolt. The traveler may be configured to move along the first actuator when the first actuator rotates. The carriage may be configured to rotate around the rotation axis when the traveler moves. Step 406 of adjusting the angle of the clip relative to the coupler body may include rotating the first actuator.

The clip retention and adjustment mechanism may include a biasing member configured to urge the clip to rotate around the rotation axis toward an open position. Step 406 of adjusting the angle of the clip relative to the coupler body may include rotating the clip against the urging of the biasing member.

The clip retention and adjustment mechanism may include a catch having a hook portion and removably coupling the clip to a clip retention and adjustment mechanism may include disposing the hook portion in an aperture of the clip.

The clip retention and adjustment mechanism may further include a threaded bolt as a second actuator. The catch may have a threaded aperture configured to receive the threaded bolt. The catch may be configured to move along the second actuator when the second actuator rotates. The clip may be configured to move along the rotation axis when the catch moves, for example, due to the hook portion of the catch being disposed within an aperture of the clip. Step 408 of adjusting the extent of the clip relative to the coupler body may include rotating the second actuator.

Method 400 may optionally include disposing a security door of the coupling assembly in a secured position relative to the carriage, thereby preventing actuation of the second actuator.

Method 400 may optionally include disposing a removable outer cover over the clip retention and adjustment mechanism, thereby preventing access to the first actuator. Disposing the removable outer cover over the clip retention and adjustment mechanism may further secure the security door in the secured position. In some examples, method 400 may include locking the removable outer cover in a secured position relative to the coupler body.

Selected Aspects and Examples

This section describes additional aspects and features of vehicle roof racks, coupling assemblies, and related systems and methods, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A1. A rack for carrying cargo on top of a vehicle, the rack comprising:
a crossbar and a pair of coupling assemblies configured to mount the crossbar on top of a vehicle such that a long axis of the crossbar is substantially horizontal and perpendicular to a longitudinal axis of the vehicle;
wherein each coupling assembly includes:
a coupler body including a crossbar clamp assembly configured to be coupled to the crossbar;
a base portion configured to sit on a roof of the vehicle;
a clip configured to grip an edge portion of the roof of the vehicle; and
a clip retention and adjustment mechanism configured to independently allow angular adjustment of the clip around a rotation axis and linear adjustment of the clip along a translation axis, the rotation axis perpendicular to the long axis of the crossbar and the translation axis perpendicular to the rotation axis.

A2. The rack of paragraph A1, wherein the crossbar clamp includes interchangeable hardware for coupling the coupler body to differently-shaped crossbars.

A3. The rack of paragraph A1, wherein the crossbar clamp includes interchangeable hardware for selectively coupling to one of a crossbar sleeve and a T-slot underneath a crossbar.

A4. The rack of paragraph A1, wherein the crossbar clamp includes a crossbar-securing bolt oriented perpendicular to the long axis of the crossbar.

A5. The rack of paragraph A1, wherein the crossbar clamp is configured to allow a pitch angle adjustment of the crossbar relative to the coupler body around the long axis of the crossbar.

A6. The rack of paragraph A1, wherein the coupling assembly is configured to allow a toe angle adjustment of the base portion and a frame coupled to the base portion relative to the crossbar around a toe axis perpendicular to the long axis of the crossbar and the longitudinal axis of the vehicle.

A7. The rack of paragraph A1, wherein the base portion is configured to rotate with respect to the coupler body about a base pivot axis oriented parallel to the longitudinal axis of the vehicle.

A8. The rack of paragraph A1, wherein the clip retention and adjustment mechanism includes (a) a carriage pivotally mounted to the coupler body and configured to rotate around a rotation axis oriented parallel to the longitudinal axis of the vehicle, the carriage having a slot for receiving a clip along a translation axis perpendicular to the rotation axis, (b) a catch configured to releasably engage an aperture in the clip, (c) a first actuator configured to rotate the carriage around the rotation axis, and (d) a second actuator configured to move the catch and the clip relative to the coupler body along the translation axis.

A9. The rack of paragraph A8, wherein the first actuator is a threaded bolt oriented parallel to the long axis of the crossbar.

A10. The rack of paragraph A9, wherein the second actuator is a threaded bolt oriented parallel to the translation axis of the clip and is configured to rotate around the translation axis, the catch has a threaded aperture through which the second actuator passes, and the catch is configured to move along the second actuator when the second actuator rotates.

A11. The rack of paragraph A8, wherein the clip retention and adjustment mechanism includes a biasing member configured to urge the clip to rotate around the rotation axis toward an open position.

A12. The rack of paragraph A8, wherein the coupling assembly includes a security door having a secured position relative to the clip retention and adjustment mechanism, in which access to the second actuator is prohibited, and an unsecured position relative to the clip retention and adjustment mechanism, in which access to the second actuator is permitted.

A13. The rack of paragraph A12, wherein the coupling assembly includes a removable outer cover having a secured position relative to the coupler body in which the security door is held in the secured position and access to the first actuator is prohibited.

A14. The rack of paragraph A1, wherein the clip is one of a set of clips configured to be releasably coupled to the clip retention and adjustment mechanism.

B1. A coupling assembly for connecting a rooftop cargo carrying system to a vehicle, the coupling assembly comprising:
a coupler body including a crossbar clamp configured to be coupled to a crossbar, the crossbar having a long axis oriented transverse to a direction of vehicle travel;
a base portion configured to abut a roof of the vehicle; and
a clip retention and adjustment assembly including (a) a carriage pivotally mounted to the coupler body and configured to rotate around a rotation axis oriented parallel to the direction of vehicle travel, the carriage having a slot for receiving a clip along a translation axis perpendicular to the rotation axis, (b) a catch configured to releasably engage an aperture in the clip, (c) a first actuator configured to rotate the carriage around the rotation axis, and (d) a second actuator configured to move the catch and the clip relative to the coupler body along the translation axis.

B2. The coupling assembly of paragraph B1, wherein the crossbar clamp includes interchangeable hardware for coupling the coupler body to differently-shaped crossbars.

B3. The coupling assembly of paragraph B1, wherein the crossbar clamp includes interchangeable hardware for selectively coupling to one of a crossbar sleeve and a T-slot underneath a crossbar.

B4. The coupling assembly of paragraph B1, wherein the crossbar clamp includes a crossbar-securing bolt oriented perpendicular to the long axis of the crossbar.

B5. The coupling assembly of paragraph B1, wherein the crossbar clamp is configured to allow a pitch angle adjustment of the crossbar relative to the coupler body around the long axis of the crossbar.

B6. The coupling assembly of paragraph B1, wherein the coupling assembly is configured to allow a toe angle adjustment of the base portion and a frame coupled to the base portion relative to the crossbar around a toe axis perpendicular to the long axis of the crossbar and the direction of vehicle travel.

B7. The coupling assembly of paragraph B1, wherein the base portion is configured to rotate with respect to the coupler body about a base pivot axis oriented parallel to the direction of vehicle travel.

B8. The coupling assembly of paragraph B1, wherein the first actuator is a threaded bolt oriented parallel to the long axis of the crossbar and is configured to rotate, the clip retention and adjustment mechanism includes a traveler having a threaded aperture configured to receive the first actuator, the traveler configured to move along the first actuator when the first actuator rotates, and wherein the carriage is configured to rotate around the rotation axis when the traveler moves.

B9. The coupling assembly of paragraph B1, wherein the second actuator is a threaded bolt oriented parallel to the translation axis of the clip and is configured to rotate around an axis parallel to the translation axis, the catch has a threaded aperture through which the second actuator passes, and the catch is configured to move along the second actuator when the second actuator rotates.

B10. The coupling assembly of paragraph B1, wherein the clip retention and adjustment mechanism includes a biasing member configured to urge the clip to rotate around the rotation axis toward an open position.

B11. The coupling assembly of paragraph B1, wherein the coupling assembly includes a security door having a secured position relative to the clip retention and adjustment mechanism, in which access to the second actuator is prohibited, and an unsecured position relative to the clip retention and adjustment mechanism, in which access to the second actuator is permitted.

B12. The coupling assembly of paragraph B11, wherein the coupling assembly includes a removable outer cover having a secured position relative to the coupler body in which the security door is held in the secured position and access to the first actuator is prohibited.

B13. The coupling assembly of paragraph B1, wherein the clip is one of a set of clips configured to be releasably coupled to the clip retention and adjustment mechanism.

C1. A method of removably attaching a coupling assembly to a roof of a vehicle, the coupling assembly for use in a rooftop cargo carrying system, the method comprising:
    disposing the coupling assembly on the roof of the vehicle proximate an edge portion of the roof, the coupling assembly including a base portion connected to a coupler body, with the base portion abutting the roof of the vehicle;
    adjusting an angle of a clip relative to the coupler body by rotating the clip about a rotation axis oriented parallel to a direction of vehicle travel; and
    adjusting an extent of the clip relative to the coupler body by moving the clip along a translation axis perpendicular to the rotation axis;
    wherein the clip is configured to grip the edge portion of the roof by adjusting the angle of the clip relative to the coupler body and by adjusting the extent of the clip relative to the coupler body; and
    wherein adjusting the angle of the clip is independent of adjusting the extent of the clip.

C2. The method of paragraph C1, further comprising coupling a crossbar to the coupling assembly via a crossbar clamp connected to the coupler body, the crossbar having a long axis oriented transverse to a direction of vehicle travel.

C3. The method of paragraph C2, further comprising adjusting a pitch angle of the crossbar relative to the coupler body by rotating the crossbar around the long axis of the crossbar.

C4. The method of paragraph C2, further comprising adjusting a toe angle of the coupling assembly by rotating the base portion relative to the crossbar around a toe axis perpendicular to the long axis of the crossbar and the direction of vehicle travel.

C5. The method of paragraph C2, wherein disposing the coupling assembly on the roof of the vehicle includes adjusting the relative disposition of the coupling assembly and the crossbar along the long axis of the crossbar.

C6. The method of paragraph C2, wherein coupling the crossbar to the coupling assembly includes actuating a crossbar-securing bolt oriented perpendicular to the long axis of the crossbar.

C7. The method of paragraph C1, wherein disposing the coupling assembly on the roof of the vehicle includes adjusting an angle of the base portion relative to the coupler body, the base portion configured to rotate around a base pivot axis oriented parallel to the direction of vehicle travel.

C8. The method of paragraph C1, further comprising removably coupling the clip to a clip retention and adjustment mechanism connected to the coupler body.

C9. The method of paragraph C8, wherein removably coupling the clip to a clip retention and adjustment mechanism includes inserting the clip into a carriage of the clip retention and adjustment mechanism, wherein the carriage (a) is pivotally mounted to the coupler body, (b) is configured to rotate around the rotation axis, and (c) has a slot for receiving the clip along the translation axis.

C10. The method of paragraph C9, wherein the clip retention and adjustment mechanism includes a catch having a hook portion and wherein removably coupling the clip to a clip retention and adjustment mechanism includes disposing the hook portion in an aperture of the clip.

C11. The method of paragraph C9, wherein the clip retention and adjustment mechanism includes a threaded bolt as a first actuator and a traveler having a threaded aperture, the traveler is configured to move along the first actuator when the first actuator rotates, and the carriage is configured to rotate around the rotation axis when the traveler moves, and wherein adjusting an angle of a clip relative to the coupler body includes rotating the first actuator.

C12. The method of paragraph C11, wherein the clip retention and adjustment mechanism includes a biasing member configured to urge the clip to rotate around the rotation axis toward an open position and wherein adjusting an angle of a clip relative to the coupler body includes rotating the clip against the urging of the biasing member.

C13. The method of paragraph C10, wherein the clip retention and adjustment mechanism includes a threaded bolt as a second actuator, the catch has a threaded aperture, the catch is configured to move along the second actuator when the second actuator rotates, and the clip is configured to move along the rotation axis when the catch moves, and wherein adjusting an extent of the clip relative to the coupler body includes rotating the second actuator.

C14. The method of paragraph C13, further comprising disposing a security door of the coupling assembly in a secured position relative to the carriage, thereby preventing actuation of the second actuator.

C15. The method of paragraph C11, further comprising disposing a removable outer cover over the clip retention and adjustment mechanism, thereby preventing access to the first actuator.

C16. The method of paragraph C14, further comprising locking the removable outer cover in a secured position relative to the coupler body.

ADVANTAGES, FEATURES, BENEFITS

The different embodiments of the coupling assembly and related systems and methods described herein provide several advantages over known solutions for mounting crossbars on vehicles. For example, illustrative embodiments and examples described herein allow a clip to grip an edge portion of the roof of a vehicle by rotating around a rotation axis and by moving along a translation axis. Additionally, and among other benefits, illustrative embodiments and examples described herein allow a clip to be chosen from a set of clips to accommodate a specific edge portion of a vehicle roof, thereby facilitating the attaching of the coupling assembly to a variety of vehicle roofs.

Additionally, and among other benefits, illustrative embodiments and examples described herein facilitate the use of interchangeable crossbar clamps on the same coupler.

No other known system or device can perform all of these functions. However, not all embodiments and examples described herein provide the same advantages or the same degree of advantage.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

We claim:

1. A rack for carrying cargo on top of a vehicle, the rack comprising: a crossbar and a pair of coupling assemblies configured to mount the crossbar on top of a vehicle such that a long axis of the crossbar is substantially horizontal and perpendicular to a longitudinal axis of the vehicle;
wherein each coupling assembly includes:
a coupler body including a crossbar clamp assembly configured to be coupled to the crossbar;
a base portion configured to sit on a roof of the vehicle;
a clip configured to grip an edge portion of the roof of the vehicle; and
a clip retention and adjustment mechanism configured to independently allow angular adjustment of the clip around a rotation axis and linear adjustment of the clip along a translation axis, the rotation axis perpendicular to the long axis of the crossbar and the translation axis perpendicular to the rotation axis, wherein the clip retention and adjustment mechanism includes (a) a carriage pivotally mounted to the coupler body and configured to rotate around a rotation axis oriented parallel to the longitudinal axis of the vehicle, the carriage having a slot for receiving a clip along a translation axis perpendicular to the rotation axis, (b) a catch configured to releasably engage an aperture in the clip, (c) a first actuator configured to rotate the carriage around the rotation axis, and (d) a second actuator configured to move the catch and the clip relative to the coupler body along the translation axis.

2. The rack of claim 1, wherein the crossbar clamp includes interchangeable hardware for coupling the coupler body to differently-shaped crossbars.

3. The rack of claim 1, wherein the crossbar clamp includes interchangeable hardware for selectively coupling to one of a crossbar sleeve and a T-slot underneath a crossbar.

4. The rack of claim 1, wherein the crossbar clamp includes a crossbar-securing bolt oriented perpendicular to the long axis of the crossbar.

5. The rack of claim 1, wherein the crossbar clamp is configured to allow a pitch angle adjustment of the crossbar relative to the coupler body around the long axis of the crossbar.

6. The rack of claim 1, wherein the coupling assembly is configured to allow a toe angle adjustment of the base portion and a frame coupled to the base portion relative to the crossbar around a toe axis perpendicular to the long axis of the crossbar and the longitudinal axis of the vehicle.

7. The rack of claim 1, wherein the coupling assembly includes a security door having a secured position relative to the clip retention and adjustment mechanism, in which access to the second actuator is prohibited, and an unsecured position relative to the clip retention and adjustment mechanism, in which access to the second actuator is permitted.

8. The rack of claim 7, wherein the coupling assembly includes a removable outer cover having a secured position relative to the coupler body in which the security door is held in the secured position and access to the first actuator is prohibited.

9. A coupling assembly for connecting a rooftop cargo carrying system to a vehicle, the coupling assembly comprising:
a coupler body including a crossbar clamp coupled to a crossbar, the crossbar having a long axis oriented transverse to a direction of vehicle travel;
a base portion configured to abut a roof of the vehicle; and
a clip retention and adjustment assembly including (a) a carriage pivotally mounted to the coupler body and configured to rotate around a rotation axis oriented parallel to the direction of vehicle travel, the carriage having a slot for receiving a clip along a translation axis perpendicular to the rotation axis, (b) a catch configured to releasably engage an aperture in the clip, (c) a first actuator configured to rotate the carriage around the rotation axis, and (d) a second actuator configured to move the catch and the clip relative to the coupler body along the translation axis.

10. The coupling assembly of claim 9, wherein the base portion is configured to rotate with respect to the coupler body about a base pivot axis oriented parallel to the direction of vehicle travel.

11. The coupling assembly of claim 9, wherein the first actuator is a threaded bolt oriented parallel to the long axis of the crossbar and is configured to rotate, the clip retention and adjustment mechanism includes a traveler having a threaded aperture configured to receive the first actuator, the traveler configured to move along the first actuator when the first actuator rotates, and wherein the carriage is configured to rotate around the rotation axis when the traveler moves.

12. The coupling assembly of claim 9, wherein the second actuator is a threaded bolt oriented parallel to the translation axis of the clip and is configured to rotate around an axis parallel to the translation axis, the catch has a threaded aperture through which the second actuator passes, and the catch is configured to move along the second actuator when the second actuator rotates.

13. The coupling assembly of claim 9, wherein the clip retention and adjustment mechanism includes a biasing member configured to urge the clip to rotate around the rotation axis toward an open position.

* * * * *